(12) United States Patent
Takaoka et al.

(10) Patent No.: US 7,075,269 B2
(45) Date of Patent: Jul. 11, 2006

(54) CHARGING EQUIPMENT FOR SECONDARY BATTERY

(75) Inventors: Hiromi Takaoka, Hyogo (JP); Yasuo Osabe, Hyogo (JP); Takamichi Fujiwara, Hyogo (JP)

(73) Assignee: Techno Core International Co., Ltd., Osaka (JP)

( * ) Notice: Subject to any disclaimer, the term of this patent is extended or adjusted under 35 U.S.C. 154(b) by 105 days.

(21) Appl. No.: 10/517,820

(22) PCT Filed: Jun. 9, 2004

(86) PCT No.: PCT/JP2004/008046

§ 371 (c)(1),
(2), (4) Date: Dec. 14, 2004

(87) PCT Pub. No.: WO2005/081378

PCT Pub. Date: Sep. 1, 2005

(65) Prior Publication Data

US 2005/0231163 A1     Oct. 20, 2005

(30) Foreign Application Priority Data

Feb. 25, 2004  (JP) ............................. 2004-049782
May 21, 2004  (JP) ............................. 2004-152146

(51) Int. Cl.
  *H02J 7/00*      (2006.01)

(52) U.S. Cl. ....................................................... 320/107
(58) Field of Classification Search ................. 320/107

See application file for complete search history.

(56) References Cited

U.S. PATENT DOCUMENTS 5,442,274 A * 8/1995 Tamai ......................... 320/146

FOREIGN PATENT DOCUMENTS

| JP | 8-9563 | 1/1996 |
| JP | 2001-228225 | 8/2001 |
| JP | 2002199607 | * 7/2002 |
| JP | 3430439 | 5/2003 |

OTHER PUBLICATIONS

International Search Report International Application No. PCT/JP2004/008046, Japanese Patent Office, mailed on Oct. 5, 2004.
Dialog File 351, Accession No. 14146984, Derwent WP1 English language abstract for JP 2001-228225.

* cited by examiner

*Primary Examiner*—Pia Tibbits
(74) *Attorney, Agent, or Firm*—Sterne, Kessler, Goldstein & Fox P.L.L.C.

(57) ABSTRACT

An object of the present invention is to provide a charging equipment for a secondary battery that can charge any secondary battery, regardless of its kind, size and the like, until its charging rate comes to approximately 100%. The charging equipment comprises: a voltage increment device for incrementing a check voltage by a preset pitch of voltage from a lowest check voltage lower than a rated equilibrium voltage at full charge; a switch for switching applied voltage to the secondary battery to the special charging voltage or the check voltage supplied; a first judging means for judging whether an electric current detected by a current detection part is smaller than or as large as a preset standard electric current for judging; and a second judging means for judging whether the time required for the period from the last affirmative judgment to the present affirmative judgment is larger than two times as large as the time required for the period from the before-last affirmative judgment to the last affirmative judgment.

16 Claims, 19 Drawing Sheets

Fig. 6

| | a value of output from the arithmetic circuit 53A | a waveform outputted from the supremum and infimum voltage setting circuit 52A | a waveform outputted from the PWM output terminal 48 |
|---|---|---|---|
| the 1st increment | $E_1 = E_L - (E_H - E_L) \cdot \dfrac{n-1}{n} = E_0 + \Delta E$ | $E_H$ $E_L$ | w |
| the 2nd increment | $E_2 = E_L - (E_H - E_L) \cdot \dfrac{n-2}{n} = E_0 + 2\Delta E$ | $E_H$ $E_L$ | 2w |
| the 3rd increment | $E_3 = E_L - (E_H - E_L) \cdot \dfrac{n-3}{n} = E_0 + 3\Delta E$ | $E_H$ $E_L$ | 3w |
| ... | ... | ... | ... |
| the (n−1)th increment | $E_{n-1} = E_L - (E_H - E_L) \cdot \dfrac{1}{n} = E_0 + (n-1) \cdot \Delta E$ | $E_H$ $E_L$ | (n−1)w |
| the nth increment | $E_n = E_L = E_0 + n \cdot \Delta E$ | $E_H$ $E_L$ | nw |

Fig. 9

| a value of output from the arithmetic circuit 53B | a waveform outputted from the supremum and infimum voltage setting circuit 52B | a waveform outputted from the PWM output terminal 48 |
|---|---|---|
| the 1st increment | $E_1 = E_L + (E_H - E_L) \cdot \dfrac{1}{n} = E_0 + \Delta E$ | | |
| the 2nd increment | $E_2 = E_L + (E_H - E_L) \cdot \dfrac{2}{n} = E_0 + 2 \cdot \Delta E$ | | |
| the 3rd increment | $E_3 = E_L + (E_H - E_L) \cdot \dfrac{3}{n} = E_0 + 3 \cdot \Delta E$ | | |
| ... | ... | ... |
| the (n-1)th increment | $E_{n-1} = E_L + (E_H - E_L) \cdot \dfrac{n-1}{n} = E_0 + (n-1) \cdot \Delta E$ | | |
| the nth increment | $E_n = E_L + (E_H - E_L) \cdot \dfrac{n}{n} = E_0 + n \cdot \Delta E$ | | |

Fig. 10

| | a value of output from the arithmetic circuit 53C | a waveform outputted from the supremum and infimum voltage setting circuit 52C | a waveform outputted from the PWM output terminal 48 |
|---|---|---|---|
| the 1st decrement | $E_1 = E_L + (E_H - E_L) \cdot \frac{1}{n} = E_0 + \Delta E$ | $E_H$ $E_L$ | $(n-1)w$ |
| the 2nd decrement | $E_2 = E_L + (E_H - E_L) \cdot \frac{2}{n} = E_0 + 2 \cdot \Delta E$ | $E_H$ $E_L$ | $(n-2)w$ |
| the 3rd decrement | $E_3 = E_L + (E_H - E_L) \cdot \frac{3}{n} = E_0 + 3 \cdot \Delta E$ | $E_H$ $E_L$ | $(n-3)w$ |
| ... | ... | ... | ... |
| the $(n-1)$th decrement | $E_{n-1} = E_L + (E_H - E_L) \cdot \frac{n-1}{n} = E_0 + (n-1) \cdot \Delta E$ | $E_H$ $E_L$ | $w$ |
| the $n$th decrement | $E_n = E_L + (E_H - E_L) \cdot \frac{n}{n} = E_0 + n \cdot \Delta E$ | $E_H$ $E_L$ | |

Fig. 11

| | a value of output from the arithmetic circuit 53C | a waveform outputted from the supremum and infimum voltage setting circuit 52C | a waveform outputted from the PWM output terminal 48 |
|---|---|---|---|
| the 1st decrement | $E_1 = E_L - (E_H - E_L) \cdot \frac{n-1}{n} = E_0 + \Delta E$ | $E_H$ / $E_L$ | $(n-1)w$ |
| the 2nd decrement | $E_2 = E_L - (E_H - E_L) \cdot \frac{n-2}{n} = E_0 + 2\Delta E$ | $E_H$ / $E_L$ | $(n-2)w$ |
| the 3rd decrement | $E_3 = E_L - (E_H - E_L) \cdot \frac{n-3}{n} = E_0 + 3\Delta E$ | $E_H$ / $E_L$ | $(n-3)w$ |
| ... | ... | ... | ... |
| the (n-1)th decrement | $E_{n-1} = E_L - (E_H - E_L) \cdot \frac{1}{n} = E_0 + (n-1) \cdot \Delta E$ | $E_H$ / $E_L$ | $w$ |
| the nth decrement | $E_n = E_L = E_0 + n \cdot \Delta E$ | $E_H$ / $E_L$ | |

Fig. 14
(a)
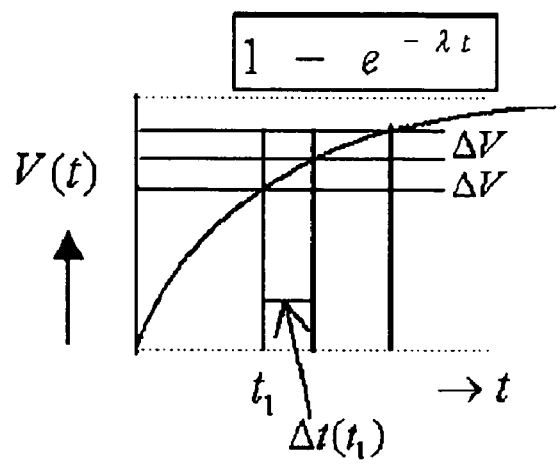
(b)
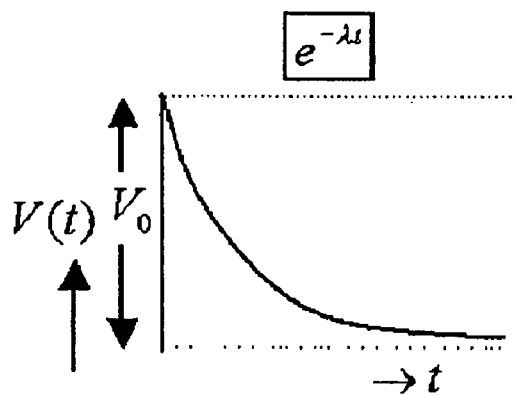
(c)
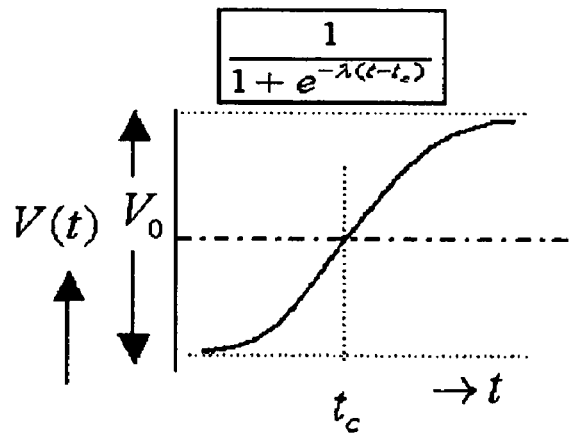

Fig. 17

| $V_{eq}(t_1)$ | $\lambda \Delta t(t_1)$ | $A$ | $V_{eq}(t_1 + 2\Delta t(t_1))$ |
|---|---|---|---|
| 1.39 | ↓ 0.463 | | |
| 1.4 | ↓ 0.887 | + | |
| 1.41 | ↓ 2×0.887 | − | |
| | | | 1.4158 vs.1.42 |

Fig. 19

| $V_{check}$ | (1)$V_{eq1}$=1.455,$V_{eq2}$=1.395V | | (2)$V_{eq1}$=1.445,$V_{eq2}$=1.395V | | (3)$V_{eq1}$=1.435,$V_{eq2}$=1.395V | |
|---|---|---|---|---|---|---|
| | $e^{-\lambda(t-tc)}$ | $\lambda \Delta t(t)$ | $e^{-\lambda(t-tc)}$ | $\lambda \Delta t(t)$ | $e^{-\lambda(t-tc)}$ | $\lambda \Delta t(t)$ |
| 1.4 | 11 | ↓ | 9 | | 7 | |
| 1.41 | 3 | 1.299 | 2.33 | 1.35 | 1.666 | 1.435 |
| 1.42 | 1.4 | 0.762 | 1 | 0.847 | 0.6 | 1.02 |
| 1.43 | 0.714 | 0.673 | 0.4286 | 0.847 | 0.1428 | 1.435 |
| 1.44 | 0.333 | 0.762 | 0.1111 | 1.35 | | 1.435x2 |
| 1.45 | 0.0909 | 1.3 | | 1.35x2 | | |
| | | 1.3x2 | | | | |
| final Veq | 1.45459 | 99.97% | 1.44463 | 99.97% | 1.4347 | 99.97% |

CHARGING EQUIPMENT FOR SECONDARY BATTERY

TECHNICAL FIELD OF THE INVENTION

The present invention relates to a charging equipment for charging a secondary battery, such as a nickel-cadmium battery, a nickel metal hydride battery, a lead storage battery, and the like.

BACKGROUND ART

When charging a secondary battery, it is important to know how full the secondary battery is charged: to what extent of its battery capacity the secondary battery is charged during the charging process.

Conventionally, however, there was no way to know this. A conventional charger for a secondary battery stops charging the secondary battery by detecting an abnormal phenomenon (such as a rise of its temperature, its minus delta V characteristic, and the like) which occurs in the secondary battery (see, for example, patent document 1).

In this charging method, however, there is a problem that the secondary battery is overcharged, so that the internal structure of the secondary battery required for repeating charge and discharge cycles is damaged, whereby effective battery cycles of the secondary battery is decreased.

Then, in consideration of this problem, the same applicant as this application invented a charger for the secondary battery that can charge the secondary battery rapidly and accurately without damaging the secondary battery, and checks whether the secondary battery reaches its fully charged condition (i.e., the condition when its charging rate is 100%) periodically (see, patent document 2).

This charging equipment for the secondary battery charges the secondary battery, repeating by turns a main charge for letting large electric current flow through the secondary battery and a check of the fully charged condition of the secondary battery.

During the main charge, the secondary battery is charged by an applied special charging voltage higher than equilibrium voltage at full charge for a predetermined time. Special charging voltage is the voltage corresponding to the peak value of electric current outside the irreversible chemical reaction region at which the increasing rate of charging electric current to increasing applied voltage becomes smaller, and then a charging electric current does not increase any more as the secondary battery whose charging rate is approximately 0% is charged with increasing applied voltage Equilibrium voltage at full charge is the electromotive force of the secondary battery in equilibrium with the voltage supplied by the variable power supply when the variable power supply is adjusted so that the electric current detected by the current detection meter may be set to ±0 mA, where the plus terminal of the secondary battery in its fully charged condition (i.e., its charging rate is 100%) is connected to the plus terminal of the variable power supply, and the minus terminal of the secondary battery is connected to the minus terminal of the variable power supply, and the current detection meter is interposed between the secondary battery and the variable power supply.

During the check of the fully charged condition of the secondary battery, electric current flowing through the secondary battery is detected during application of the equilibrium voltage at full charge to the secondary battery for a short time, and then the secondary battery is checked whether it reaches the fully charged condition by comparing the detected electric current with the standard electric current for finishing charging.

When the detected electric current is larger than the standard electric current for finishing charging, the main charge is repeated again. Otherwise, when the detected electric current is not larger than the standard electric current for finishing charging, it is judged that the secondary battery reaches the fully charged condition and charging of the secondary battery is stopped. [Patent Document 1] The Japanese Patent Laid Open Gazette Hei. 8-9563 [Patent Document 2] The Japanese Patent Gazette No. 3430439

SUMMARY OF THE INVENTION

Problem to be Solved by the Invention

As mentioned above, the patent document 2 discloses a charger which charges a secondary battery based on checking whether the charging rate of the secondary battery comes to 100% by periodically applying the equilibrium voltage at full charge to the secondary battery. However, at a later time, it comes to light that, even if secondary batteries belong to the same kind (such as nickel-cadmium batteries, nickel metal hydride batteries, and the like) and the same size (such as size AA batteries, size AAA batteries, and the like), some of the secondary batteries cannot be fully charged because of the following reason.

Secondary batteries belonging to the same kind and size subtly differ in battery capacity and equilibrium voltage at full charge if they are made by different makers, belong to different models, or have different use histories. Further, secondary batteries belonging to the same kind, size and model and made by the same maker may differ in battery capacity and equilibrium voltage at full charge if they are made in different countries. Therefore, when secondary batteries of the same kind and the same size are charged by the charging equipment disclosed by the patent document 2, some of them are charged till their charging rate becomes approximately 90%, and others are overcharged beyond their charging rate 100%, because their proper equilibrium voltages at full charge are subtly different from the equilibrium voltage at full charge set in the charging equipment.

Therefore, an object of the present invention is to provide a charging equipment for the secondary battery, by which any secondary battery, regardless of its kind, side and the like, can be fully charged so that its charging rate becomes approximately 100%.

Solution of the Problem

The problem to be solved by the present invention is as mentioned above. Next, a solution of the problem will be explained.

According to a first aspect of the present invention, a charging equipment for a secondary battery comprises: a voltage increment means for incrementing check voltage by a preset pitch of voltage from lowest check voltage lower than rated equilibrium voltage at full charge of any secondary battery of all kinds to be charged; a charge voltage supply means for supplying special charging voltage that is higher than rated equilibrium voltage at full charge of any secondary battery of all kinds to be charged but does not enter an irreversible chemical reaction region; a switch means for switching voltage applied to the secondary battery between a voltage selected from the group consisting of the special charging voltages supplied by the charge voltage supply means, and the check voltage supplied by the voltage increment means; a current detection means for detecting electric current flowing through the secondary battery during application of the check voltage to the secondary battery; a first judging means for judging whether electric current detected by the current detection means is smaller than or as large as a preset standard electric current for judging; and a second judging means for judging whether a time required for a period from the last affirmative judgment judged by the first judging means to the present affirmative judgment judged by the first judging means is larger than r (r is a real number not smaller than 1) times as large as a time required for a period from the before-last affirmative judgment judged by the first judging means to the last affirmative judgment judged by the first judging means. Charging of the secondary battery is controlled according to first to seventh steps. At the first step, the lowest check voltage is applied to the secondary battery for a short time, and the current detection means detects electric current flowing through the secondary battery during the short time. At the second step, the first judging means judges the detected electric current so as to execute a command selected from the group consisting of passing to the third step when the electric current is larger than the standard electric current for judging, and jumping to the fourth step when the electric current is smaller than or as large as the standard electric current for judging. At the third step, the switch means switches the applied voltage to the special charging voltage, the special charging voltage is applied to the secondary battery for a predetermined time, and then the switch means switches the applied voltage to the lowest check voltage, and a step returns to the first step. At the fourth step, the voltage increment means sets renewed check voltage made by the present check voltage plus the pitch of voltage. At the fifth step, the switch means switches the applied voltage to the special charging voltage, the special charging voltage is applied to the secondary battery for a predetermined time, and then the switch means switches the applied voltage to the renewed check voltage, the renewed check voltage is applied to the secondary battery for a short time, and the current detection means detects electric current flowing through the secondary battery during the application of the renewed check voltage to the secondary battery. At the sixth step, the first judging means judges the detected electric current so as to execute a command selected from the group consisting of returning to the fifth step when the electric current is larger than the standard electric current for judging, and passing to the seventh step when the electric current is smaller than or as large as the standard electric current for judging. At the seventh step, the second judging means judges the time required for the period from the last affirmative judgment judged by the first judging means to the present affirmative judgment judged by the first judging means so as to execute a command selected from the group consisting of returning to the fourth step when the time required for the period from the last affirmative judgment judged by the first judging means to the present affirmative judgment judged by the first judging means is not larger than r times as large as the time required for the period from the before-last affirmative judgment judged by the first judging means to the last affirmative judgment judged by the first judging means, and outputting a signal to stop charging when the time required for the period from the last affirmative judgment judged by the first judging means to the present affirmative judgment judged by the first judging means is larger than r times as large as the time required for the period from the before-last affirmative judgment judged by the first judging means to the last affirmative judgment judged by the first judging means.

According to a second aspect of the charging equipment of a secondary battery of the present invention, when the signal to stop charging is outputted at the seventh step, the switch means switches the applied voltage to the special charging voltage, the special charging voltage is applied to the secondary battery for a second predetermined time, and then charging of the secondary battery is finished.

According to a third aspect of the charging equipment for a secondary battery of the present invention, the required time is measured by counting the number of switching of the applied voltage to the check voltage by the switch means.

According to a fourth aspect of the charging equipment for a secondary battery of the present invention, the voltage increment means comprises: a microcomputer for outputting a pulse wave of pulse width $c \cdot w$ from one predetermined output terminal on the premise that w is a time having a length of one of n (n is an integer not smaller than 2) equal divisional parts of one cycle of the pulse wave, and c ($c=1,2,\ldots,n$) is a variable; a supremum and infimum voltage setting circuit for inverting the maximum and the minimum of amplitude of the pulse wave outputted from the output terminal to each other, and setting the maximum amplitude of the inverted pulse wave as supremum voltage and the minimum amplitude of the inverted pulse wave as infimum voltage; and an arithmetic circuit for averaging the voltage of the pulse wave outputted from the supremum and infimum voltage setting circuit, and outputting a value of voltage made by base voltage minus the just averaged voltage. The variable c in the microcomputer is incremented, so that the value of voltage outputted from the arithmetic circuit is incremented by the pitch of voltage.

Alternatively, according to a fifth aspect of the charging equipment for a secondary battery of the present invention, the voltage increment means comprises: a microcomputer for outputting a pulse wave of pulse width $c \cdot w$ from one predetermined output terminal on the premise that w is a time having a length of one of n (n is an integer not smaller than 2) equal divisional parts of one cycle of the pulse wave, and c ($c=1,2,\ldots,n$) is a variable; a supremum and infimum voltage setting circuit for setting the maximum amplitude of the pulse wave outputted from the output terminal as supremum voltage and the minimum amplitude of the pulse wave as infimum voltage; and an arithmetic circuit for averaging the voltage of the pulse wave outputted from the supremum and infimum voltage setting circuit, and outputting a value of voltage made by base voltage plus the just averaged voltage. The variable c in the microcomputer is incremented, so that the value of voltage outputted from the arithmetic circuit is incremented by the pitch of voltage.

Alternatively, according to a sixth aspect of the charging equipment for a secondary battery of the present invention, the voltage increment means comprises: a microcomputer for outputting a pulse wave of pulse width $c \cdot w$ from one predetermined output terminal on the premise that w is a time having a length of one of n (n is an integer not smaller than 2) equal divisional parts of one cycle of the pulse wave, and c ($c=1,2,\ldots,n$) is a variable; a supremum and infimum voltage setting circuit for inverting the maximum and the minimum amplitude of the pulse wave outputted from the output terminal to each other, and setting the maximum amplitude of the inverted pulse wave as supremum voltage and the minimum amplitude of the inverted pulse wave as infimum voltage; and an arithmetic circuit for averaging the voltage of the pulse wave outputted from the supremum and infimum voltage setting circuit, and outputting a value of voltage made by base voltage plus the just averaged voltage.

The variable c in the microcomputer is decreased, so that the value of voltage outputted from the arithmetic circuit is incremented by the pitch of voltage.

Alternatively, according to the charging equipment for a secondary battery of the present invention, the voltage increment means comprises: a microcomputer for outputting a pulse wave of pulse width c·w from one predetermined output terminal on the premise that w is a time having a length of one of n (n is an integer not smaller than 2) equal divisional parts of one cycle of the pulse wave, and c (c=1,2, . . . ,n) is a variable; a supremum and infimum voltage setting circuit for setting the maximum amplitude of the pulse wave outputted from the output terminal as supremum voltage and the minimum amplitude of the pulse wave as infimum voltage; and an arithmetic circuit for averaging the voltage of the pulse wave outputted from the supremum and infimum voltage setting circuit, and outputting a value of voltage made by base voltage minus the just averaged voltage. The variable c in the microcomputer is decreased, so that the value of voltage outputted from the arithmetic circuit is incremented by the pitch of voltage.

Effect of the Invention

The above is the solution of the problem according to the present invention. Next, effects of the present invention will be explained.

By the charging equipment of the first aspect, any secondary battery, regardless of its kind, size and the like, can be charged until its charging rate becomes approximately 100%, based on seeking the equilibrium voltage at full charge of the secondary battery, thereby improving its reliability. Furthermore, the charging equipment is also available for a secondary battery, of which internal structure is partially destroyed and degraded, because it charges the secondary battery until its charging rate to its actual battery capacity comes to approximately 100%, based on seeking its actual equilibrium voltage at full charge.

The charging equipment of the second aspect has the same effect as that of the first aspect, and it can charge the secondary battery so that the charging rate of the secondary battery comes closer to 100%, whereby its reliability is improved.

The charging equipment of the third aspect has the same effect as that of the first aspect or the second aspect.

According to the charging equipment of the fourth aspect, the voltage increment means uses one predetermined output terminal of its microcomputer so as to increment the voltage, so that the derated microcomputer can preciously act to increment the voltage.

According to the charging equipment of the fifth aspect, the voltage increment means uses one predetermined output terminal of its microcomputer so as to increment the voltage, so that the derated microcomputer can preciously act to increment the voltage.

According to the charging equipment of the sixth aspect, the voltage increment means uses one predetermined output terminal of its microcomputer so as to increment the voltage, so that the derated microcomputer can preciously act to increment the voltage.

According to the charging equipment of the seventh aspect, the voltage increment means uses one predetermined output terminal of its microcomputer so as to increment the voltage, so that the derated microcomputer can preciously act to increment the voltage.

BRIEF DESCRIPTION OF THE DRAWINGS

FIG. 6 is a diagram showing the output by a voltage increment circuit 50A according to a first embodiment.

FIG. 9 is a diagram showing the output by a voltage increment circuit 50B according to a second embodiment.

FIG. 10 is a diagram showing the output by a voltage increment circuit 50C according to a third embodiment.

FIG. 11 is a diagram showing the output by a voltage increment circuit 50D according to a fourth embodiment.

FIG. 12 is a chart expanding the portion, to which an arrow P points in FIG. 2.

FIG. 14 illustrates asymptotic characteristic function charts focusing respective fixed values.

FIG. 17 is a table showing judgment of charging to be finished or not while the check voltage is incremented step by step.

FIG. 19 is a table showing judgment of charging to be finished or not while the check voltage is incremented step by step.

DESCRIPTION OF REFERENCE NUMERALS

Figure 1:
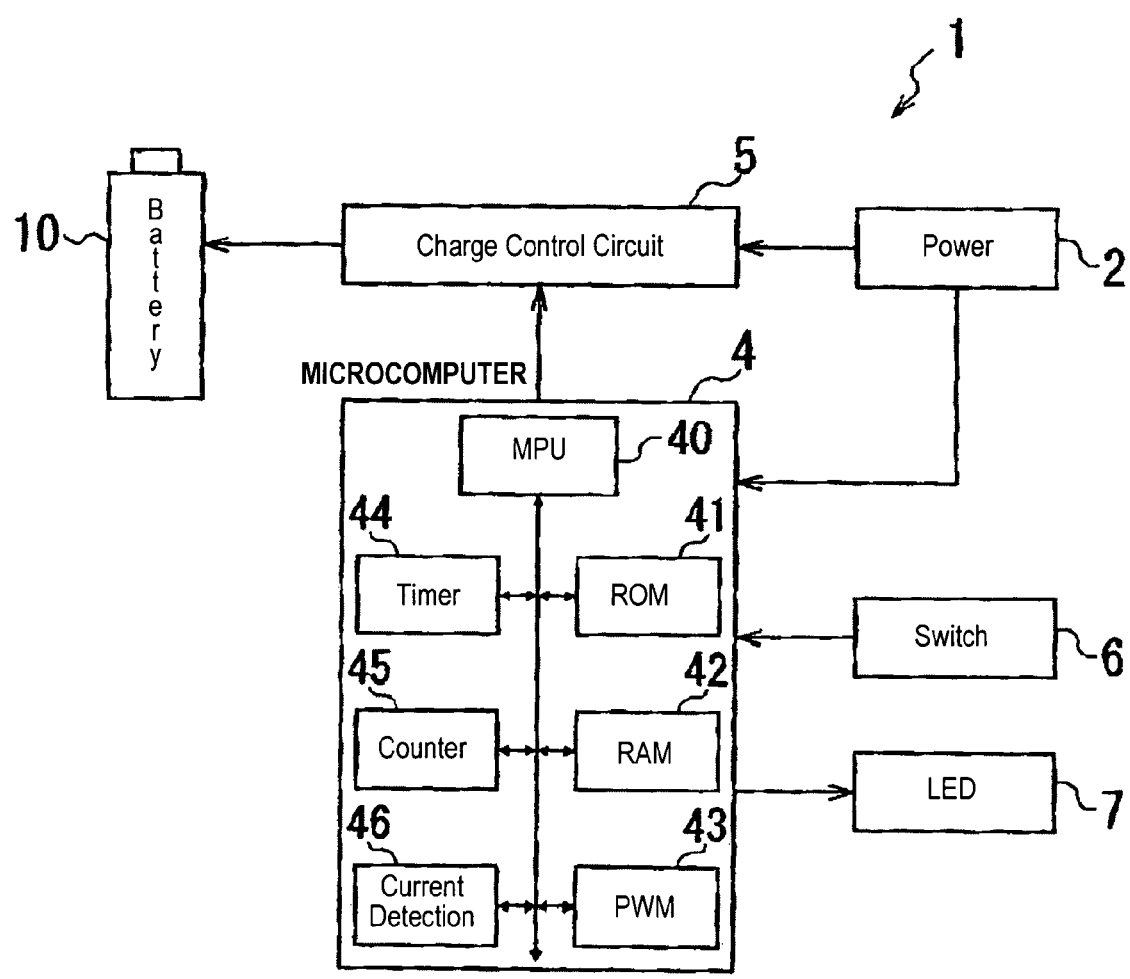
FIG. 1 is a block diagram of control composition of a charging equipment 1 for a secondary battery.

1 Charging Equipment
2 Power Supply Part
4 One-chip Micom
5 Charge Control Circuit
10 Secondary Battery
40 MPU
41 ROM
42 RAM
43 PWM
46 Current Detection Part
48 PWM Output Terminal
50 Voltage Increment Circuit
51A Supremum and Infimum Voltage Supply Circuit
52A Supremum and Infimum Voltage Setting Circuit
53A Arithmetic Circuit 51B Supremum and Infimum Voltage Supply Circuit
52B Supremum and Infimum Voltage Setting Circuit
53B Arithmetic Circuit
51C Supremum and Infimum Voltage Supply Circuit
52C Supremum and Infimum Voltage Setting Circuit
53C Arithmetic Circuit
51D Supremum and Infimum Voltage Supply Circuit
52D Supremum and Infimum Voltage Setting Circuit
53D Arithmetic circuit
56 Charge Voltage Supply Circuit
57 Check Voltage Supply Circuit
58 Switch

BEST MODE FOR CARRYING OUT THE INVENTION

A charging equipment 1 for a secondary battery explained below is characterized in that at the time of charge, large electric current is supplied to a secondary battery 10 by applying the highest voltage (a predetermined special charging voltage) $E_s$ out of the below-mentioned irreversible chemical reaction region D so as not to damage the internal structure of the secondary battery, and that at periodic intervals applied voltage is switched to the equilibrium voltage $E_{eq}$ at full charge so as to check whether the secondary battery 10 is fully charged. By the check of fully charged condition by use of the equilibrium voltage $E_{eq}$ at full charge, whether the secondary battery is fully charged can be judged instantly and accurately. With charging equipment 1, the time for fully charging a secondary battery can be reduced to thirty minutes or less. Furthermore, by the charging equipment 1, appropriate charge of electricity can be given to the secondary battery without causing excessive chemical reaction (oxidation-reduction reaction) in the secondary battery until the secondary battery is fully charged, thereby increasing effective battery cycles of the secondary battery to five thousands times or more.

Next, referring to the drawings, an embodiment of the present invention will be explained.

As shown in FIG. 1, a charging equipment 1 for a secondary battery 10 comprises: a power supply part 2 including a transformer-rectifier circuit for changing commercial alternating-current power into direct-current power, an operation switch 6 as an operation means for executing an operation such as start of charge by a user, a one-chip microcomputer (hereinafter referred to as one-chip micom) 4 as a control means for controlling charge of a secondary battery 10, a charge control circuit 5 serving as a charging means for applying the equilibrium voltage $E_{eq}$ at full charge or the special charging voltage $E_s$ higher than the equilibrium voltage $E_{eq}$ at full charge to the secondary battery 10, a LED (Light Emitting Diode) lamp 7 serving as an informational means for displaying a condition of charging or finishing charging etc., a number of input and output terminals (not shown), and the like, wherein the one-chip micom 4 is connected to the power supply part 2, the operation switch 6, the charge control circuit 5, and the LED lamp 7 by the input and output terminals.

As for this embodiment, the charging equipment comprises the LED lamp 7 as an example of the informational means for giving visual information of the condition of charging or finishing charging etc.; however, it may comprise another example of the informational means such as giving auricular information by use of sound or voice etc. The charging equipment may comprise any type of the informational means.

The one-chip micom 4 comprises a micro processing unit (hereinafter referred to as MPU) 40 serving as a central processing unit, a read only memory (hereinafter referred to as ROM) 41 serving as a storage means, a random access memory (hereinafter referred to as RAM) 42 serving as a storage means, a PWM 43 for controlling pulse width moderation, a timer 44 serving as a time clocking means, a counter 45 serving as a counting means, a current detection part 46 serving as a current detection means, and the like.

Figure 2:
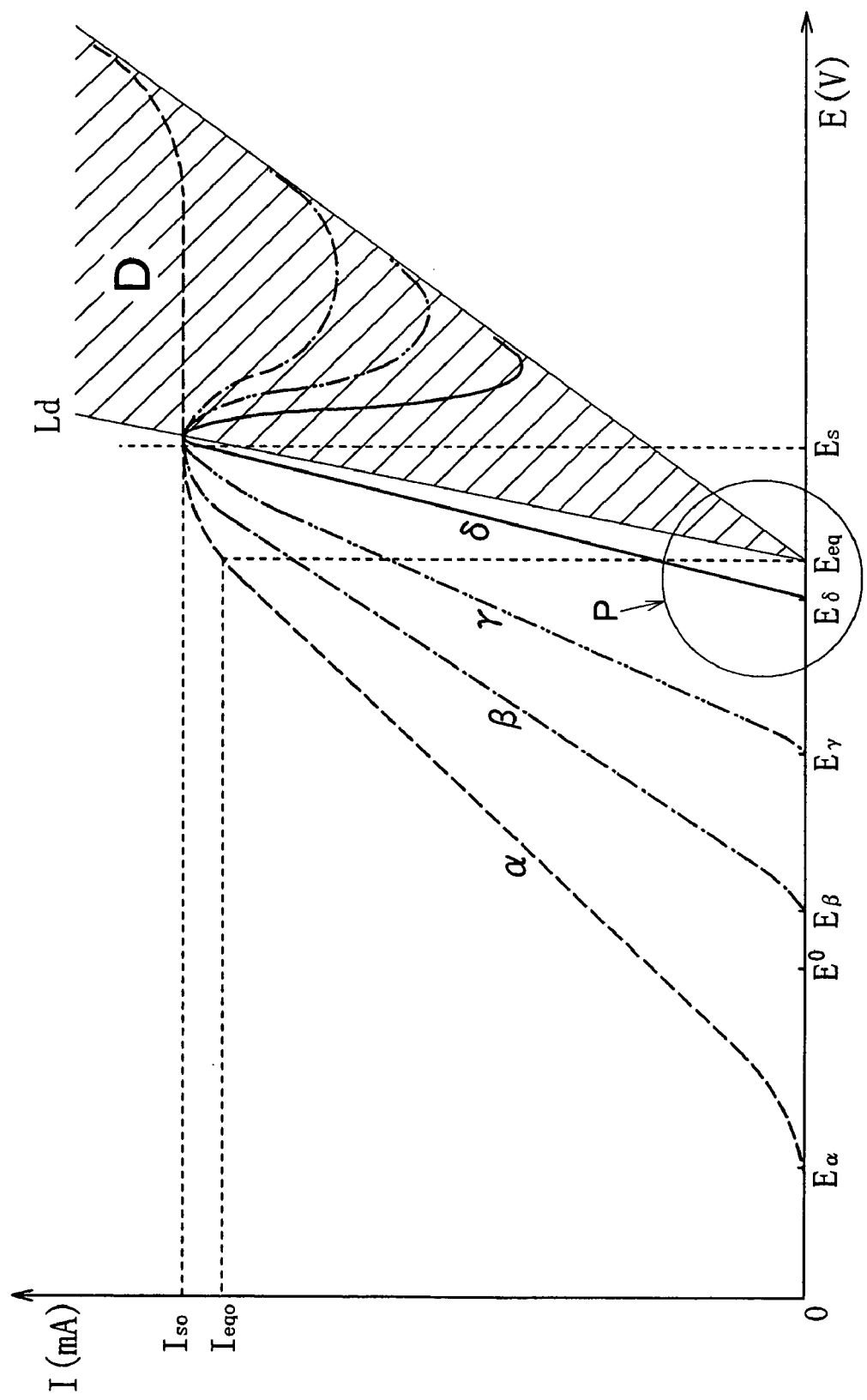
FIG. 2 illustrates current-voltage graphs of a secondary battery 10 in different charging rates.

The equilibrium voltage $E_{eq}$ at full charge of the secondary battery 10 (see FIG. 2) and the special voltage $E_s$ larger than the equilibrium voltage $E_{eq}$ of the secondary battery 10 are stored in the RAM 42. Referring to FIG. 2, as the applied voltage is increased for charging the secondary battery 10 from its almost empty condition, the increasing rate of charging electric current to increasing applied voltage ($\Delta I/\Delta E$) becomes smaller and smaller, and finally the charging electric current reaches a peak value $I_{so}$ from which it can increase no more. The special voltage $E_s$ corresponds to the peak value $I_{so}$ of charging electric current outside of the irreversible chemical reaction region D. In the ROM 43 is programmed a program for judging whether the secondary battery 10 reaches its fully charged condition or not, and the like.

The charge control circuit 5 comprises a charge voltage supply circuit for supplying the secondary battery 10 with the special charging voltage $E_s$ to which the voltage from the power supply part 2 is dropped down, a check voltage supply circuit for supplying the secondary battery 10 with the equilibrium voltage $E_{eq}$ at full charge to which the voltage from the power supply part 2 is dropped down, and a switch for switching applied voltage to the secondary battery 10 to the voltage selected from the group consisting of the special charging voltage $E_s$ supplied by the charge voltage supply circuit, and the equilibrium voltage $E_{eq}$ at full charge supplied by the check voltage supply circuit. One predetermined output terminal of the one-chip micom 4 is set as a terminal (output terminal for voltage-switching signals) for outputting a signal to switch voltage, so that, when the switch serving as a switch means receives the signal to switch voltage from the output terminal for voltage switch signal, applied voltage to the secondary battery 10 is switched to either the special charging voltage $E_s$ or the equilibrium voltage $E_{eq}$ at full charge.

A resistance for detecting check current is interposed in the check voltage supply circuit, and a branch point positioned on the input-side of the resistance for detecting check current and another branch point positioned on the output-side of the resistance for detecting check current are connected to two predetermined input terminals (input terminals for current) of the one-chip micom 4 respectively, so that electric current (check current) flowing through the secondary battery 10 is detected by detecting the difference of two values of current, each of which is inputted through each input terminal for current in the current detection part 46 of the micom 4. In other words, the above-mentioned switch is switched to the side of the check voltage supply circuit, when electric current (check current) flowing through the secondary battery 10 is detected by the difference of currents through the two input terminals for current during application of the equilibrium voltage $E_{eq}$ at full charge to the secondary battery 10.

Next, referring to the graph of FIG. 2, a characteristic of relation between voltage and current for charging the secondary battery 10 will be explained, which is a fundamental theory underlying the hereinafter description of the present charging method.

FIG. 2 shows voltage-current characteristic curves in a charged secondary battery 10 corresponding to different charging rates, with battery terminal voltage (applied voltage) E (V) as the abscissa, and charging electric current I (mA) as the ordinate.

A graph α drawn in a dashed line in FIG. 2 expresses a voltage-current characteristic during charge of the secondary battery 10 when its charging rate is approximately 0%. In this case, even if the voltage $E_\alpha$ lower than the base voltage (nominal voltage) $E^0$ is applied, charging electric current starts to flow. This applied voltage (battery terminal voltage) when charging electric current starts to flow is defined as open-circuit voltage. The larger the charging rate is, the higher the open-circuit voltage becomes.

A graph β drawn with a long dashed short dashed line in FIG. 2 expresses a voltage-current characteristic during charging of the secondary battery 10 when its charging rate is approximately 50%. Open-circuit voltage $E_\beta$ for starting flow of electric current to be charged is applied higher than the open-circuit voltage $E_\alpha$ for charging the secondary battery 10 when its charging rate is approximately 0%.

A graph γ drawn in a long dashed double-short dashed line in FIG. 2 expresses a voltage-current characteristic during charging of the secondary battery 10 when its charging rate is approximately 90%, requiring open-circuit voltage $E_\gamma$ higher than $E_\beta$. A graph δ drawn in a continuous line in FIG. 2 expresses a voltage-current characteristic during charging of the secondary battery 10 when its charging rate is approximately (less than) 100%, requiring open-circuit voltage $E_\delta$ higher than $E_\gamma$. Open-circuit voltage for the secondary battery 10 when its charging rate is just 100% is equal to the equilibrium voltage $E_{eq}$ which is higher than $E_\delta$.

After applied voltage exceeds the open-circuit voltage $E_\alpha$, $E_\beta$, $E_\gamma$, $E_\delta$ etc. corresponding to the charging rate of the secondary battery 10, charging electric current starts to increase substantially in proportion to increase of applied voltage, and applied voltage passes over a certain voltage (an inflection point of the voltage-current curve), when the increase rate of charging electric current to applied voltage ($\Delta I/\Delta E$) begins to decrease. Finally, charging electric current does not increase any more even if applied voltage is increased, so that it reaches peak electric current $I_{so}$.

In this way, applied voltage corresponding to the peak electric current $I_{so}$, which is a charging electric current when the increase rate of charging electric current to applied voltage ($\Delta I/\Delta E$) becomes zero, is the special charging voltage $E_s$ peculiar to each secondary battery 10, determined by a kind, a degraded state, and other element of the secondary battery 10 to be charged.

In case voltage higher than the special charging voltage $E_s$ is applied to the secondary battery 10, oxidation-reduction reaction of active substance is further promoted in the secondary battery 10 so as to cause electrolysis reaction, whereby the characteristic of negative resistance appears. In the worst case, the internal structure of the secondary battery 10 may be destroyed by unexpected abnormalities such as exothermic reaction and swelling reaction. Even if such the worst case does not happen, irreversible chemical reaction is promoted so as to exert great harm on effective battery cycles of the secondary battery 10. The irreversible chemical reaction region D hatched in FIG. 2 is a region of the relationship between charging electric current and applied voltage such as to cause irreversible chemical reaction which is harmful to the secondary battery 10.

Therefore, it is necessary for charging a secondary battery 10 to control voltage applied to the secondary battery 10 lest the charging electric current relative to applied voltage should cross the reaction divide border Ld and enter into the irreversible chemical reaction region D through the process of charging until the secondary battery 10 is fully charged (i.e., the state of its charging rate is 100%).

Incidentally, the battery capacity of the secondary battery 10 is reckoned as a product of charging electric current multiplied by charge time. Therefore, for shortening the charge time, it is necessary to increase charging electric current.

As shown in FIG. 2, when the equilibrium voltage $E_{eq}$ at full charge is applied to the secondary battery 10 of approximately 0% charging rate, charging electric current decreases from current $I_{eqo}$ ($<I_{so}$) in proportion to increase of its charging rate. Finally, the charging electric current becomes 0 mA when the secondary battery 1 reaches the fully charged condition, so that this condition facilitates easy judgment whether the secondary battery 10 is fully charged. However, the charging electric current during charging by use of the equilibrium voltage $E_{eq}$ at full charge is lower than that by use of the special charging voltage $E_s$, so that charge time of charge by use of the equilibrium voltage $E_{eq}$ at full charge becomes considerably long.

Considering this, the special charging voltage $E_s$ is applied for the main charge so that such a large electric current flows through the secondary battery as the highest charging electric current (the peak electric current $I_{so}$) out of the irreversible chemical reaction region D, and at periodic intervals, the voltage applied to the secondary battery 10 is switched to the equilibrium voltage $E_{eq}$ at full charge so as to check whether the secondary battery 10 is fully charged or not.

The voltage to be applied for charging the secondary battery 10 with large electric current is not limited to the special charging voltage $E_s$ corresponding to the peak electric current $I_{so}$. It may be lower than the voltage $E_s$ so as to correspond to electric current smaller than the peak electric current $I_{so}$.

Next, the conventional charging equipment 1 for a secondary battery before improvement to the charging equipment 1 for a secondary battery according to the present invention will be explained.

This conventional charging equipment 1 is a fundamental composition of the charging equipment 1 according to the present invention shown hereinafter.

FIG. 1 shows composition of the conventional charging equipment 1 according to the conventional invention. A judging program serving as a judging means for comparing check current i detected by the current detection part 46 during application of the equilibrium voltage $E_{eq}$ at full charge to the secondary battery 10 with a preset standard electric current J (e.g. 10 mA) for finishing charging. In the ROM 41 of the one-chip micom 4 is a program for judging which is larger of the check current i and the standard electric current J.

Figure 3:
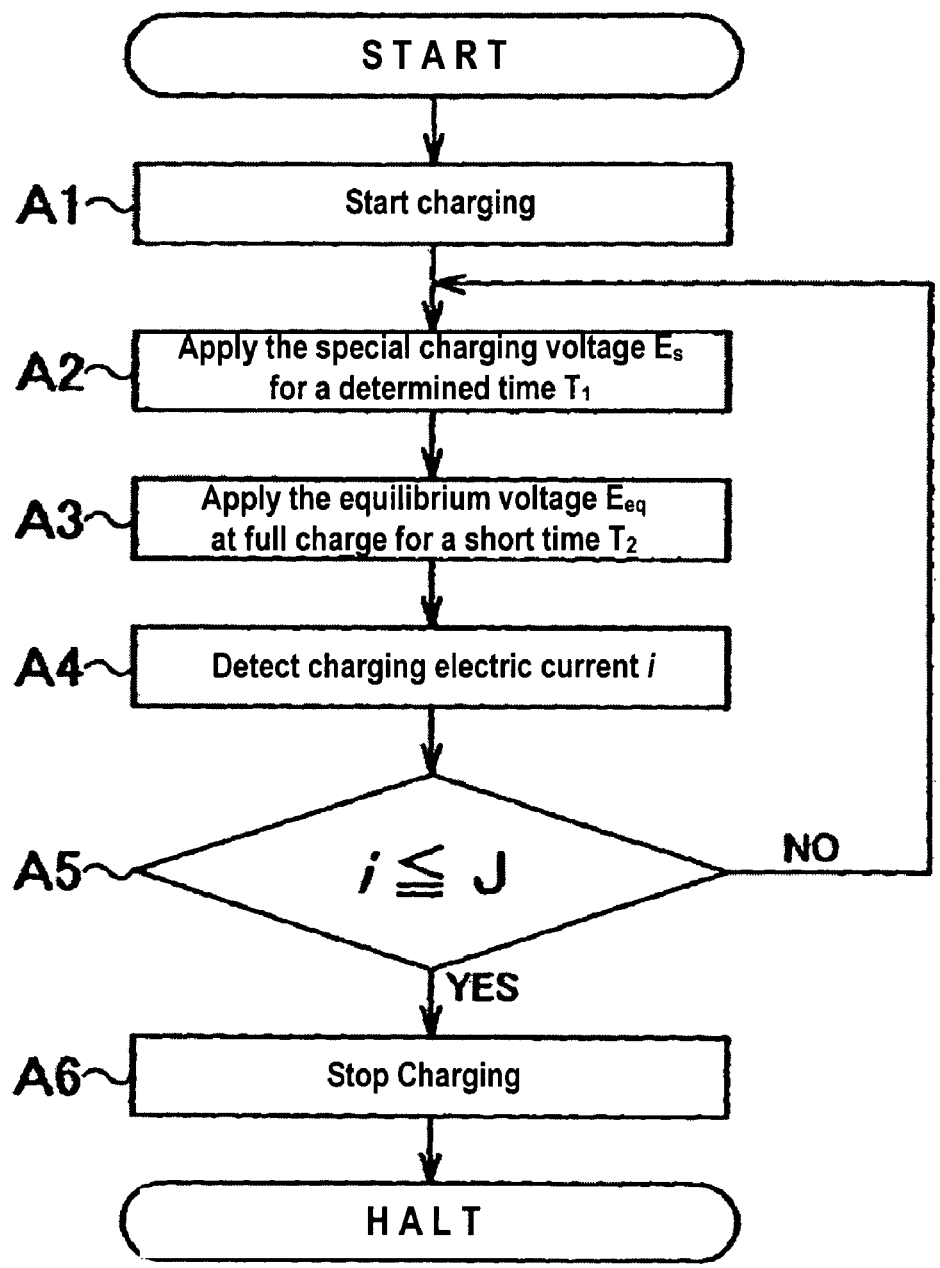
FIG. 3 is a flow chart of charging control by a charging equipment 1 for a secondary battery according to the conventional invention.

Next, the flow of charging the secondary battery 10 by the conventional charging equipment 1 will be explained referring to FIG. 3.

First of all, a user inputs a kind of secondary battery 10 to be charged to the one-chip micom 4 by manipulating the operation switch 6, thereby selecting the special charging voltage $E_s$ and equilibrium voltage $E_{eq}$ at full charge in correspondence to the kind of secondary battery 10 from a table in the RAM 42 in the one-chip micom 4.

Both the special charging voltage $E_s$ and the equilibrium voltage $E_{eq}$ at full charge are determined according to the kind of the secondary battery such as the nickel-cadmium battery, the nickel metal hydride battery etc., the battery capacity, the size of the secondary battery, and the like. For example, with regard to the nickel-cadmium battery, the equilibrium voltage $E_{eq}$ at full charge is set to around 1.41 V, and the special charging voltage $E_s$ is set to around 1.80 V higher than the equilibrium voltage $E_{eq}$.

Then, a user pushes the operation switch 6 so as to start charging [step A1], whereby the special charging voltage $E_s$ is applied to the secondary battery 10 for a predetermined time (e.g. 55 seconds) $T_1$ [step A2].

The timer 4 clocks a lapse of the predetermined time $T_1$, when applied voltage is switched to the equilibrium voltage $E_{eq}$ at full charge [step A3]. Electric current i flowing through the secondary battery 10 is detected by the current detection part 46 in the ROM 41 of the one-chip micom 4 while the equilibrium voltage $E_{eq}$ at full charge is applied to the secondary battery 10 for a short time $T_2$ (e.g. 5 seconds) [step A4].

Then, the judging program in ROM 41 compares the detected electric current i with the standard electric current J for finishing charging [step A5]. When the detected electric current i is larger than the standard electric current J for finishing charging, the control step returns to the step A2, and the above steps (charge control) are repeated. Otherwise, when the detected electric current i is below or equal to the standard electric current J for finishing charging, it is recognized that the secondary battery 10 is fully charged, so as to stop charging the secondary battery 10 [step A6].

Thus, the charging equipment 1 of the conventional invention can charge the secondary battery 10 appropriately through the process of full charge without causing excessive chemical reaction (oxidation-reduction reaction) in the secondary battery 10. Further, this charging equipment 1 can prevent the internal structure of the secondary battery 10 from being damaged, thereby increasing effective battery cycles of the secondary battery 10 by leaps and bounds. Moreover, at the time of main charge, the charging equipment 1 applies the special charging voltage $E_s$ higher than the equilibrium voltage $E_{eq}$ at full charge to the secondary battery 10 so as to make considerably high charging electric current flow through the secondary battery 10, thereby reducing charge time sharply.

As mentioned above, during charging of the secondary battery 10, the conventional charging equipment 1 periodically applies the equilibrium voltage $E_{eq}$ at full charge to the secondary battery 10 so as to check whether the charging rate of the secondary battery 10 comes to 100% or not. However, it becomes clear that some of the secondary batteries 10 of the same kind (such as nickel-cadmium batteries, nickel metal hydride batteries, and the like) and the same size (such as size AA batteries, size AAA batteries, and the like) cannot be fully charged because of the following reason.

The secondary batteries 10 belonging to the same kind and the same size may have slightly difference in their battery capacities or their equilibrium voltages at full charge because of the difference of makers, manufacturing processes, or usage histories. Such difference of the secondary batteries 10 belonging to the same kind and the same size is more possible if they are made by a foreign maker. For this reason, it happens that the true equilibrium voltage at full charge of the secondary battery in charging is slightly different from the equilibrium voltage $E_{eq}$ at full charge set in the charging equipment 1, so that, after charging of the secondary batteries 10 of the same kind and the same size by the conventional charging equipment 1, some of them may actually be 90% charged, and others may be overcharged beyond 100% charging rate.

In consideration of such point, the charging equipment 1 of the present invention is improved as follows.

FIG. 1 also shows composition of the charging equipment 1 according to the present invention. The charging equipment 1 of the present invention has almost the same composition with the conventional equipment 1 except the one-chip micom 4 and the charge control circuit 5.

As for the charging equipment 1 of the present invention, in the RAM 42 of the one-chip micom 4 are stored a lowest check voltage $E_0$ lower than the lowest rated equilibrium voltage at full charge of those of secondary batteries 10 of all kinds intended for charging, a special charging voltage $E_t (\leq E_s)$ that is higher than the highest rated equilibrium voltage at full charge of those of secondary batteries 10 of all kinds intended for charging but does not come into an irreversible chemical reaction region D, and a preset pitch of voltage $\Delta E$.

In the ROM 41 of the one-chip micom 4 is programmed a subroutine program which is additionally carried out in the above-mentioned pulse width modulation control by the PWM 43. A pulse wave modulated by the PWM 43 has a pulse width c·w on the premise that w is a piece of time width equal to one cycle of the pulse wave divided evenly by n ($n=(E_n-E_0)/\Delta E$) and c (c=1,2, . . . ,n) is a variable. The subroutine program increments (or decrements) the pulse width c·w of the pulse wave step by step, by incrementing (or decreasing) the valuable c by 1 from 1 to n whenever a later-discussed condition is met. Incidentally, the highest check voltage $E_n$, the lowest check voltage $E_0$, and the pitch of voltage $\Delta E$ are set so that the counted number n becomes an integer not smaller than 2.

Figure 4:
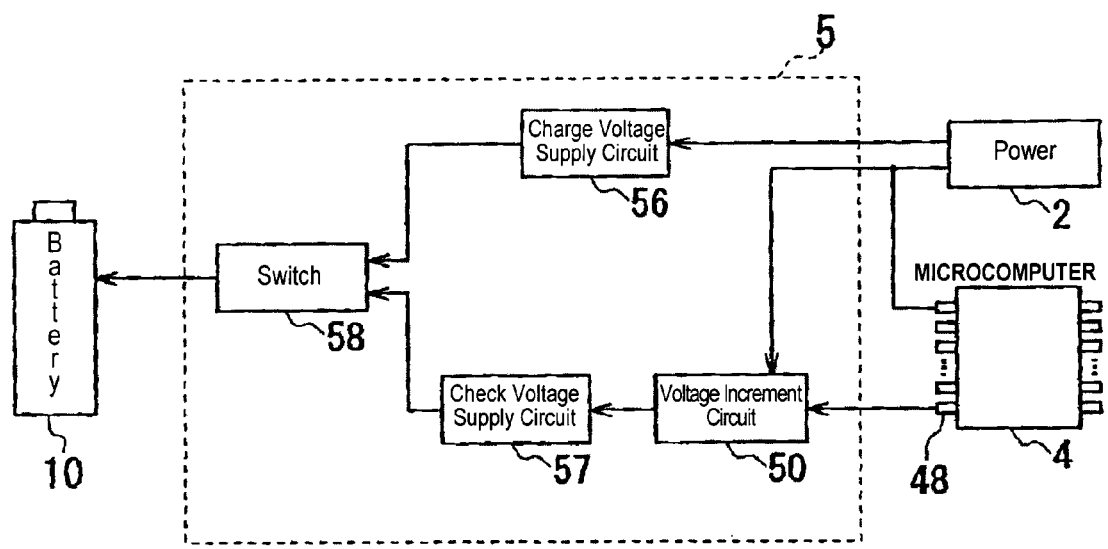
FIG. 4 is a block diagram of composition of a charge control circuit 5 of a charging equipment 1 for a secondary battery according to the present invention.

As shown in FIG. 4, the one-chip micom 4 has a number of input and output terminals, and one predetermined terminal of them is set as a PWM output terminal 48 for outputting the pulse wave of the pulse width c·w modulated in the PWM 43.

The charge control circuit 5 comprises a charge voltage supply circuit 56 for supplying the secondary battery 10 with the special charging voltage $E_t$ to which the voltage from the power supply part 2 is dropped down, a voltage increment circuit 50 for incrementing check voltage $E_c$ by the pitch of voltage $\Delta E$ from the lowest check voltage $E_0$, and a check voltage supply circuit 57 for supplying the secondary battery 10 with the check voltage $E_c$ outputted from the voltage increment circuit 50, and a switch 58 for switching voltage applied to the secondary battery 10 between the special charging voltage $E_t$ supplied by the charge voltage supply circuit 56 and the check voltage $E_c$ supplied by the check voltage supply circuit 57. Another predetermined output terminal of the one-chip micom 4 is set for outputting a signal to switch voltage (output terminal for voltage-switching signals). The switch 58 serving as a switch means, when it receives the signal to switch voltage from the output terminal for voltage-switching signal, switches the applied voltage to the secondary battery 10 between the special charging voltage $E_t$ and the check voltage $E_c$.

A resistance for detecting check current is interposed in the check voltage supply circuit 57, and a branch point positioned on the input-side of the resistance for detecting check current and another branch point positioned on the output-side of the resistance for detecting check current are connected to two predetermined input terminals (input terminals for current) of the one-chip micom 4 respectively, so that electric current (check current) flowing through the secondary battery 10 is detected by detecting the difference of two values of current, each of which is inputted through each input terminal for current in the current detection part

46 of the one-chip micom 4. In other words, the switch 58 is switched to the side of the check voltage supply circuit 57, when electric current (check current) flowing through the secondary battery 10 is detected by detecting a difference between the currents through the two input terminals for current during application of the check voltage $E_c$ to the secondary battery 10.

Next, a voltage increment device of the present invention serving as a voltage increment means for incrementing the check voltage $E_c$ by the pitch of voltage $\Delta E$ will be explained.

The voltage increment device of the present invention comprises the one-chip micom 4 for outputting the pulse wave of the pulse width c·w modulated gradationally from the PWM output terminal 48, and a voltage increment circuit 50, so that the precious movement to increment the voltage with light load can be realized by the one-chip micom 4 with small capacity.

To begin with, the background of the invention of this voltage increment device will be explained. Indeed there is a conventional voltage increment device for incrementing voltage having a one-chip micom, but the one-chip micom of the conventional voltage increment device has a lot of terminals and large capacity as follows.

As for the conventional voltage increment device, a plurality of output terminals of the one-chip micom are set for voltage increment control. An example thereof has 30 steps of voltage from infimum voltage to supremum voltage in increments of a pitch of voltage. In this example, five output terminals of the one-chip micom are set for the voltage increment control because $2^5$ is equal to $32(\geq 30)$, so that 30 kinds of ON/OFF signals can be outputted from the five output terminals, whereby 30 steps of voltage are incremented basing on these ON/OFF signals.

The above-mentioned voltage increment device having five or six output terminals set for the voltage increment control causes large load applied to the one-chip micom. If the one-chip micom has a small capacity, it is disadvantageous in throughput speed of other charge control. This is the reason why the one-chip micom of the conventional voltage increment device has a large capacity. However, the one-chip micom with large capacity is expensive, thereby being disadvantageous with respect to cost.

In consideration of the above, the present voltage increment device is invented so as to ensure the precious movement to increment the voltage with light load.

As mentioned above, the voltage increment device of the present invention comprises the one-chip micom 4 for outputting the pulse wave of the pulse width c·w modulated gradationally from the PWM output terminal 48, and the voltage increment circuit 50. The voltage increment circuit 50 is, for example, comprised as follows.

First, a voltage increment circuit 50A according to a first embodiment will be explained.

Figure 5:
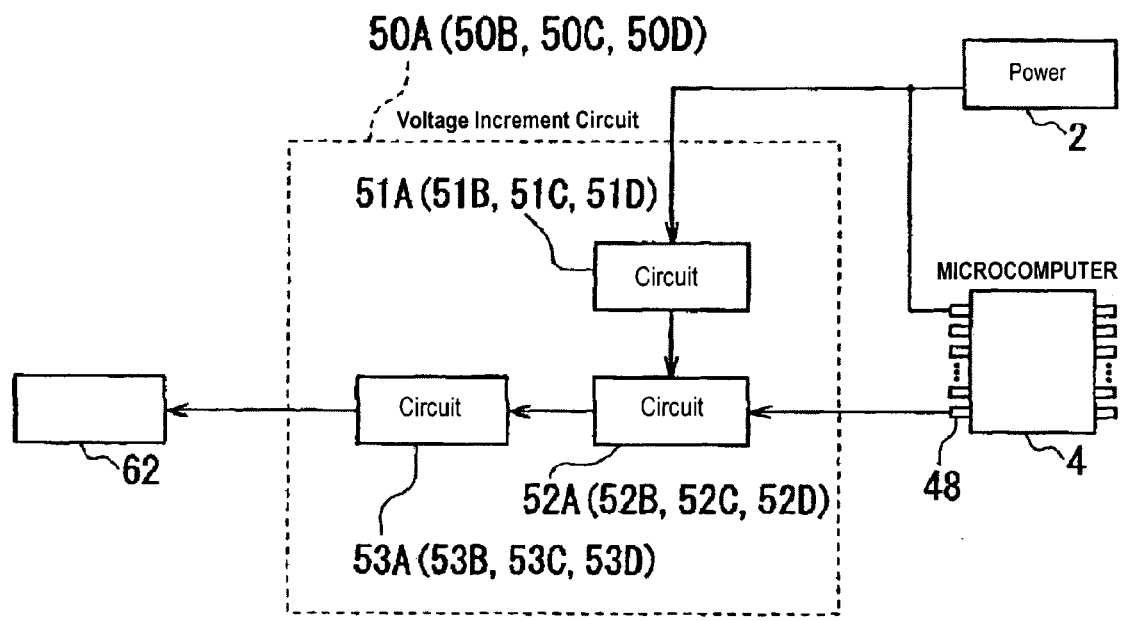
FIG. 5 is a block diagram of composition of a voltage increment device.

As shown in FIG. 5, the voltage increment circuit 50A according to the first embodiment comprises a supremum and infimum voltage supply circuit 51A for supplying a supremum voltage $E_H$ and an infimum voltage $E_L$, a supremum and infimum voltage setting circuit 52A for inverting the maximum and minimum amplitudes of the pulse wave outputted from the output terminal to each other, and setting the maximum amplitude of the inverted pulse wave to the supremum voltage $E_H$ and the minimum amplitude of the inverted pulse wave to the infimum voltage $E_L$, and an arithmetic circuit 53A for averaging the voltage of the pulse wave outputted from the supremum and infimum voltage setting circuit 52A and outputting a voltage made by a base voltage minus the averaged voltage, wherein the variable c in the PWM 43 of the one-chip micom 4 is incremented, so that the check voltage $E_c$ outputted from the arithmetic circuit 53A is incremented by the pitch of voltage $\Delta E$.

Now, the highest check voltage $E_n$ serves as the infimum voltage EL (i.e., $E_L = E_n$), and the highest check voltage $E_n$ plus a voltage difference Ed between the highest check voltage $E_n$ and the lowest check voltage $E_0$ serves as the supremum voltage $E_H$ (i.e., $Ed = E_n - E_0$, $E_H = E_n + E_d$). The infimum voltage $E_L$ also serves as the base voltage $E_B$ (i.e., $E_B = E_L = E_n$).

The above-mentioned n is expressed by a formula: $n = (E_n - E_0)/\Delta E$. According to the above-mentioned setting, as shown in FIG. 6, the variable c in the PWM 43 of the one-chip micom 4 is increased from 1 to n in increments of 1, so that the check voltage $E_c$ outputted from the arithmetic circuit 53A is incremented from the lowest check voltage $E_0$ to the highest check voltage $E_n$ in increments of the pitch of voltage $\Delta E$.

In addition, when the variable c in the PWM 43 of the one-chip micom 4 is decreased the check voltage $E_c$ outputted from the arithmetic circuit 53A is decreased by the pitch of voltage $\Delta E$.

Figure 7:
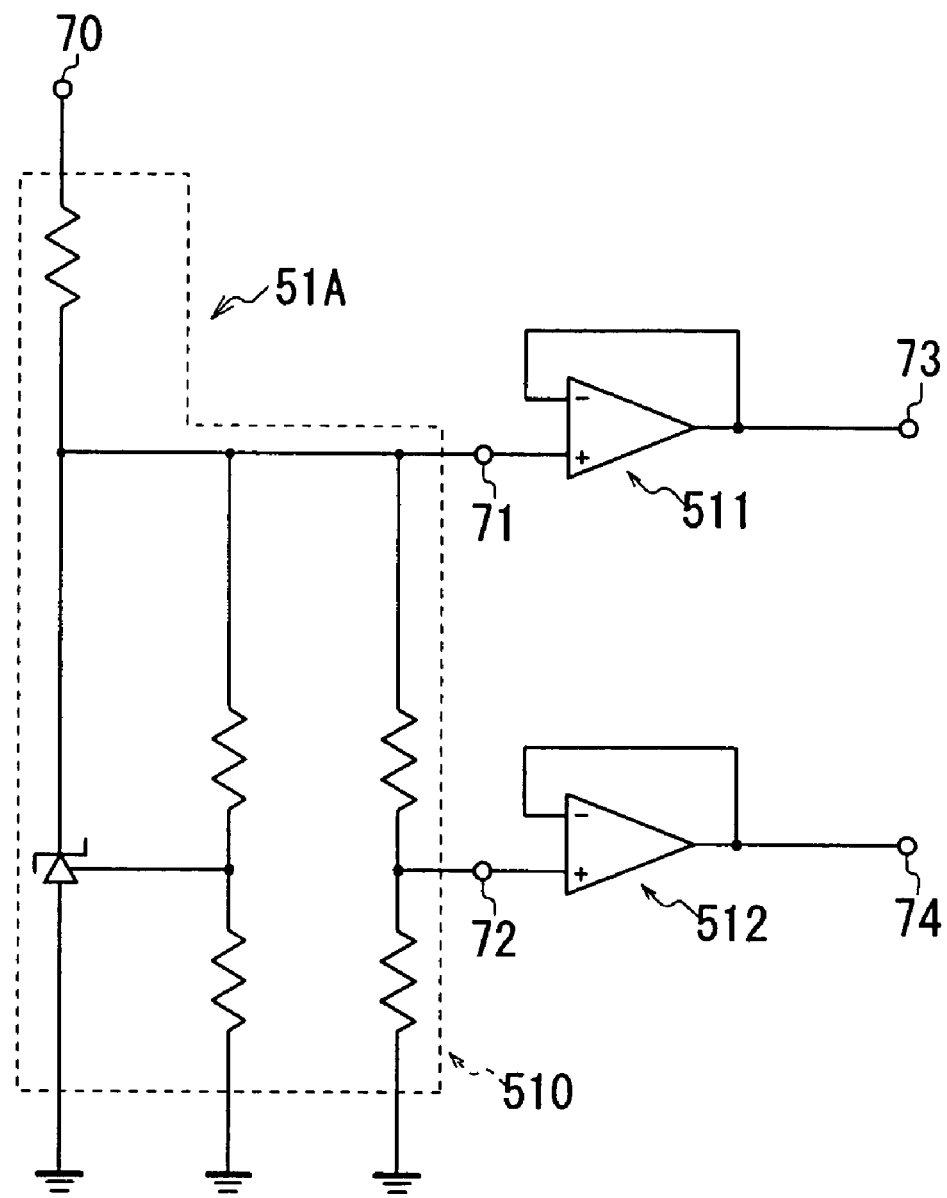
FIG. 7 is a circuit diagram showing a structure of a supremum and infimum voltage supply circuit 51A of a voltage increment circuit 50A according to the first embodiment.

FIG. 7 shows an example of the supremum and infimum voltage supply circuit 51A of the voltage increment circuit 50A. The supremum and infimum voltage supply circuit 51A comprises a shunt regulator 510, a first operational amplifier 511, and a second operational amplifier 512, wherein the power supply part 2 supplies predetermined voltage (e.g. 5 V) to an input terminal 70 to the shunt regulator 510. This predetermined voltage is transformed into the supremum voltage $E_H$ and the infimum voltage $E_L$ in the shunt regulator 510, and the supremum voltage $E_H$ is outputted from one output terminal 71 of the shunt regulator 510 while the infimum voltage $E_L$ is outputted from the other output terminal 72 of it.

The output terminal 71 is connected to a plus input terminal of the first operational amplifier 511, and a minus input terminal and an output terminal of the first operational amplifier 511 are connected. The output terminal of the first operational amplifier 511 is connected to a terminal 73. The supremum voltage $E_H$ is stabilized through the first operational amplifier 511, and outputted from the terminal 73.

Similarly, the output terminal 72 is connected to a plus input terminal of the second operational amplifier 512, and a minus input terminal and an output terminal of the second operational amplifier 512 are connected to each other. The output terminal of the second operational amplifier 512 is connected to a terminal 74. The infimum voltage $E_L$ is stabilized through the second operational amplifier 512, and outputted from the terminal 74.

Figure 8:
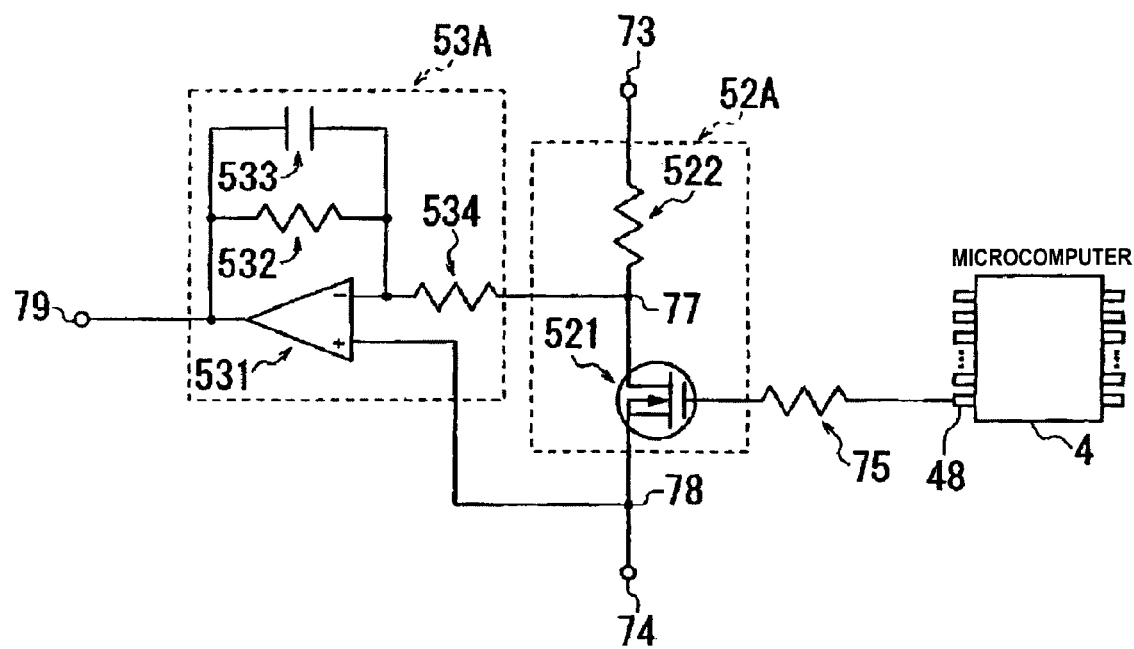
FIG. 8 is a circuit diagram showing a structure of a supremum and infimum voltage setting circuit 52A and an arithmetic circuit 53A of a voltage increment circuit 50A according to the first embodiment.
Figure 1:
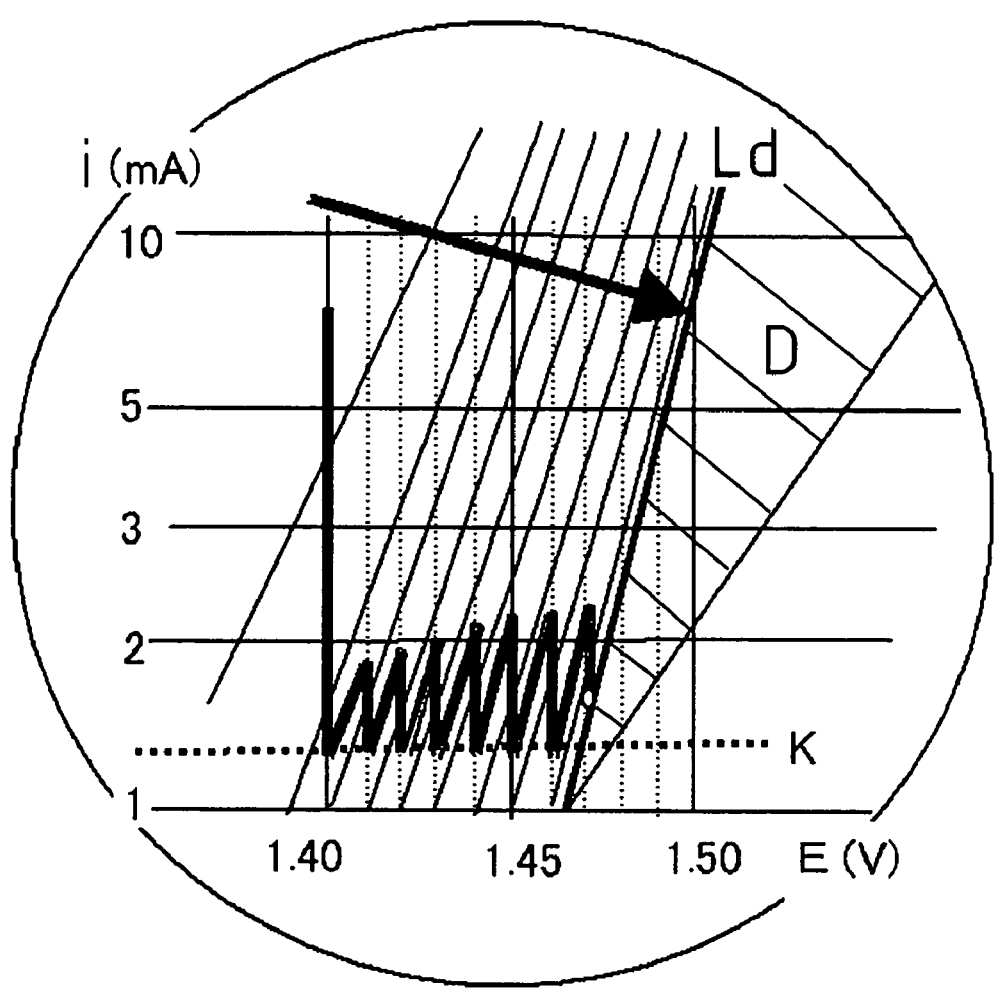

FIG. 8 shows an example of the supremum and infimum voltage setting circuit 52A and the arithmetic circuit 53A of the voltage increment circuit 50A. The above-mentioned supremum and infimum voltage supply circuit 51A supplies the supremum voltage $E_H$ and the infimum voltage $E_L$ to the supremum and infimum voltage setting circuit 52A.

The supremum and infimum voltage setting circuit 52A comprises an N-type field-effect transistor 521 and an electrical resistance 522. A gate of the transistor 521 is connected to the PWM output terminal 48 of the micom 4 through an electrical resistance 75, a source of the transistor 521 is connected to the terminal 74, and a drain of the transistor 521 is connected to the terminal through the electrical resistance 522.

As constructed above, the PWM output terminal 48 of the one-chip micom 4 supplies the pulse wave of the pulse width c·w to the gate of the transistor 521, the terminal 73 supplies the supremum voltage $E_H$ to the drain of the transistor 521, and the terminal 74 drains the infimum voltage $E_L$ to the source of the transistor 521. The transistor 521 inverts the maximum and the minimum of amplitude of the pulse wave to each other, so that the maximum of amplitude of the inverted pulse wave serves as the supremum voltage $E_H$ and the minimum of amplitude of the inverted pulse wave serves as the infimum voltage $E_L$.

The arithmetic circuit 53A comprises an operational amplifier 531. In the arithmetic circuit 53A, an electrical resistance 532 and a condenser 533 are connected in parallel between a minus input terminal and an output terminal of the operational amplifier 531, and a electrical resistance 534 is connected to the minus input terminal of the operational amplifier 531 in series. The electrical resistance 534 is connected to a branch point 77 between the drain of transistor 521 and the electrical resistance 522. The output terminal of the operational amplifier 531 is connected to a terminal 79 connected to the check voltage supply circuit 57, the plus input terminal of the operational amplifier 531 is connected to a branch point 78 between the source of the transistor and the terminal 74, and the infimum voltage $E_L$ serves as the base voltage $E_B$.

As constructed above, the voltage of the pulse wave inputted from the supremum and infimum voltage setting circuit 52A is averaged, and a value of voltage made by the infimum voltage $E_L$ minus the just averaged voltage is outputted through the arithmetic circuit 53A, so that the value of voltage serves as the check voltage $E_c$ supplied to the check voltage supply circuit 57.

Next, a voltage increment circuit 50B according to a second embodiment will be explained.

As shown in FIG. 5, the voltage increment circuit 50B according to the second embodiment comprises a supremum and infimum voltage supply circuit 51B for supplying a supremum voltage $E_H$ and an infimum voltage $E_L$, a supremum and infimum voltage setting circuit 52B for setting the maximum amplitude of the pulse wave outputted from the PWM output terminal 48 as the supremum voltage $E_H$ and the minimum amplitude of the pulse wave as the infimum voltage $E_L$, and an arithmetic circuit 53B for averaging the voltage of the pulse wave outputted from the supremum and infimum voltage setting circuit 52B and outputting a value of voltage made by a base voltage $E_B$ plus the just averaged voltage, wherein the variable c in the PWM 43 of the one-chip micom 4 is incremented, so that the check voltage $E_c$ outputted from the arithmetic circuit 53B is incremented by the pitch of voltage $\Delta E$.

Now, the lowest check voltage $E_0$ serves as the infimum voltage $E_L$ (i.e., $E_L=E_0$), and the highest check voltage $E_n$ serves as the supremum voltage $E_H$ (i.e., $E_H=E_n$). The lowest check voltage $E_0$ also serves as the base voltage $E_B$ (i.e., $E_B=E_0$).

The above-mentioned n is expressed by a formula: $n=(E_n-E_0)/\Delta E$. According to the above-mentioned setting, as shown in FIG. 9, the variable c in the PWM 43 of the one-chip micom 4 is increased from 1 to n in increments of 1, so that the check voltage $E_c$ outputted from the arithmetic circuit 53B is incremented from the lowest check voltage $E_0$ to the highest check voltage $E_n$ in increments of the pitch of voltage $\Delta E$.

In addition, when the variable c in the PWM 43 of the one-chip micom 4 is decreased, the check voltage $E_c$ outputted from the arithmetic circuit 53B is decreased by the pitch of voltage $\Delta E$.

Next, a voltage increment circuit 50C according to a third embodiment will be explained.

As shown in FIG. 5, the voltage increment circuit 50C according to the third embodiment comprises a supremum and infimum voltage supply circuit 51C for supplying supremum voltage $E_H$ and infimum voltage $E_L$, a supremum and infimum voltage setting circuit 52C for inverting the maximum and the minimum of amplitude of the pulse wave outputted from the PWM output terminal 48 to each other, and setting the maximum of amplitude of the inverted pulse wave as the supremum voltage $E_H$ and the minimum of amplitude of the inverted pulse wave as the infimum voltage $E_L$, and an arithmetic circuit 53C for averaging the voltage of the pulse wave outputted from the supremum and infimum voltage setting circuit 52C and outputting a value of voltage made by base voltage $E_B$ plus the just averaged voltage, wherein the variable c in the PWM 43 of the one-chip micom 4 is decreased, so that the check voltage $E_c$ outputted from the arithmetic circuit 53C is incremented by the pitch of voltage $\Delta E$.

Now, the lowest check voltage $E_0$ serves as the infimum voltage $E_L$ (i.e., $E_L=E_0$), and the highest check voltage $E_n$ serves as the supremum voltage $E_H$ (i.e., $E_H=E_n$). The lowest check voltage $E_0$ also serves as the base voltage $E_B$ (i.e., $E_B=E_0$).

The above-mentioned n is expressed by a formula: $n=(E_n-E_0)/\Delta E$. According to the above-mentioned setting, as shown in FIG. 10, the valuable c in the PWM 43 of the one-chip micom 4 is decreased from n to 1 in decrements of 1, so that the check voltage $E_c$ outputted from the arithmetic circuit 53B is incremented from the lowest check voltage $E_0$ to the highest check voltage $E_n$ in increments of the pitch of voltage $\Delta E$.

In addition, when the variable c in the PWM 43 of the one-chip micom 4 is incremented, the check voltage $E_c$ outputted from the arithmetic circuit 53C is decreased by the pitch of voltage $\Delta E$.

Next, a voltage increment circuit 50D according to a fourth embodiment will be explained.

As shown in FIG. 5, the voltage increment circuit 50D according to the fourth embodiment comprises a supremum and infimum voltage supply circuit 51D for supplying supremum voltage $E_H$ and infimum voltage $E_L$, a supremum and infimum voltage setting circuit 52D for setting the maximum of amplitude of the pulse wave outputted from the PWM output terminal 48 as the supremum voltage $E_H$ and the minimum of amplitude of the pulse wave as the infimum voltage $E_L$, and an arithmetic circuit 53D for averaging the voltage of the pulse wave outputted from the supremum and infimum voltage setting circuit 52D and outputting a value of voltage made by base voltage $E_B$ minus the just averaged voltage, wherein the variable c in the PWM 43 of the one-chip micom 4 is decreased, so that the check voltage $E_c$ outputted from the arithmetic circuit 53D is incremented by the pitch of voltage $\Delta E$.

Now, the highest check voltage $E_n$ serves as the infimum voltage $E_L$ (i.e., $E_L=E_n$), and the highest check voltage $E_n$ plus a voltage difference Ed between the highest check voltage $E_n$ and the lowest check voltage $E_0$ serves as the supremum voltage $E_H$ (i.e., $Ed=E_n-E_0$, $E_H=E_n+Ed$). The infimum voltage $E_L$ also serves as the base voltage $E_B$ (i.e., $E_B=E_L=E_n$).

The above-mentioned n is expressed by a formula: $n=(E_n-E_0)/\Delta E$. According to the above-mentioned setting, as shown in FIG. 11, the valuable c in the PWM 43 of the one-chip micom 4 is decreased from n to 1 in decrements of 1, so that the check voltage $E_c$ outputted from the arithmetic circuit 53D is incremented from the lowest check voltage $E_0$ to the highest check voltage $E_n$ in increments of the pitch of voltage $\Delta E$.

In addition, when the valuable c in the PWM 43 of the one-chip micom 4 is incremented, the check voltage $E_c$ outputted from the arithmetic circuit 53B is decreased by the pitch of voltage $\Delta E$.

The voltage increment device is constructed as above mentioned, and it increments the check voltage $E_c$ from the lowest check voltage $E_0$ to the highest check voltage $E_n$ in increments of the pitch of voltage $\Delta E$, by incrementing or decrementing the valuable c whenever a later-discussed condition is met.

In other words, this voltage increment device sets renewed check voltage $E_c$ ($E_c = E_{c-1} + \Delta E$) made by the present check voltage $E_{c-1}$ plus the pitch of voltage $\Delta E$ whenever the later-discussed condition is met.

In this regard, the check voltage $E_c$ is the voltage that is incremented from the lowest voltage $E_0$ in increments of the pitch of voltage $\Delta E$ c times, and it can be also expressed by the formula: $E_c = E_0 + c \cdot \Delta E$.

In this voltage increment device, only the one predetermined output terminal of the one-chip micom 4 is used for increment of the voltage, thereby reducing load applied to the one-chip micom 4. In this way, such a small capacity of the one-chip micom 4 can realize the precious action for increment the voltage with light load.

Next, programs programmed in the ROM 41 of the one-chip micom 4 will be explained.

In the ROM 41 of the one-chip micom 4 are programmed: a first judging program for judging whether electric current i detected by the current detection part 46 during application of the check voltage $E_c$ to the secondary battery 10 is smaller than (or equal to) a preset standard electric current K for judging (e.g. 1 mA) or not; a count program for detecting the points on the counter 45 which counts switching of applied voltage to the check voltage $E_c$ by the voltage control circuit 5 for the period from the last affirmative judgment (judgment that the detected electric current i during application of the check voltage $E_{c-1}$ to the secondary battery 10 is smaller than (or equal to) the standard electric current K for judging) by the first judging program to the present affirmative judgment (judgment that the detected electric current i during application of the check voltage $E_c$ to the secondary battery 10 is smaller than (or equal to) the standard electric current K for judging) judged by the first judging program, and registering the points on the counter 45; and a second judging program for judging whether the counted number of switchings of the applied voltage to the check voltage $E_c$ for the period from the last affirmative judgment to the present affirmative judgment judged by the first judging program is larger than r (r is a real number not smaller than 1 and the best mode of r is that $1 \leq r \leq 2$) times the counted number of switchings of the applied voltage to the check voltage $E_{c-1}$ for the period from the before-last affirmative judgment to the last affirmative judgment or not.

It is assumed that the count program for counting the switching and the second judging program for judging are executed in the condition that $c \geq 2$.

As mentioned above, the charging equipment 1 for a secondary battery of the present invention has the ROM 41 of the one-chip micom storing the first and second judging programs serving as judging means and the count program serving as count means.

In addition, the count program and the second judging program are not limited to the above-mentioned. The count program may alternatively use the timer 44 for measuring the elapsed time from the last affirmative judgment judged by the first judging program to the present affirmative judgment judged by the first judging program, and the second judging program may alternatively judge whether the elapsed time from the last affirmative judgment judged by the first judging program to the present affirmative judgment by the first judging program is larger than r times the elapsed time from the before-last affirmative judgment to the last affirmative judgment.

Next, the general outlines of charging by the charging equipment 1 for a secondary battery of the present invention will be explained.

The charging by the charging equipment 1 for a secondary battery of the present invention is now compared to the high jump of athletics. Suppose here is an athlete whose high jump potential is not known precisely (a secondary battery whose equilibrium voltage at full charge is not known precisely).

In the first step, a bar is set to the lowest height (the voltage to be applied is set to the lowest check voltage $E_0$), and then he tries jumping (charging). If the athlete clears this lowest height (if the detected electric current i is smaller than (or equal to) the standard electric current K for judging at the judgment by the first judging program), the number of trials for clear of this height is registered. As concerns a general rule of the high jump, three trials are allowed. However, according to the assumed rule for this comparison, r times the number of trials for clearing the last set height (the last set check voltage $E_{c-1}$) are allowed. It is supposed that r is set to 2. If three trials were performed for clearing the last set height (the last set check voltage $E_{c-1}$), six trials are allowed for clearing the present set height (the renewed check voltage $E_c$) to which the height of the bar (voltage) is incremented by the preset pitch of height (the preset pitch of voltage $\Delta E$). If the sixth trial for clearing the present set height (judging by the second judging program) is failed, jumping (charging) is finished.

FIG. 12 is a chart of an expanded portion pointed by an arrow P in FIG. 2. The situation will be represented by the case of a nickel-hydrogen battery.

A voltage-current characteristic line is directed along an arrow in FIG. 12 with the progress of charge (the upturn of charging rate), and reaches a reaction boundary Ld which is a point of 100% charging rate.

First of all, the lowest check voltage $E_0$ is set to 1.40 V. The battery is charged by the special charging voltage that is higher than equilibrium voltage $E_{eq}$ at full charge but does not come into the irreversible chemical reaction region D, and the charging condition of the battery is checked by the lowest check voltage $E_0$. The charging and checking are repeated. As the number of the checks by the lowest check voltage $E_0$ increases, the detected electric current i during each of the checks decreases so that it drops along a bold line on the scale of 1.40 V in FIG. 12. For example, it is judged at the twentieth check by the lowest check voltage $E_0$ that the detected electric current i is smaller than (or equal to) the standard electric current K for judging.

Accordingly, the voltage increment device sets the next check voltage $E_1$ to 1.41 V made by the lowest check voltage $E_0$ plus 0.01 V. During the first check of charging condition by use of this check voltage $E_1$, electric current that is a little less than 2 mA flows through the nickel-hydrogen battery. As the number of checks by use of the check voltage $E_1$ increases, the detected electric current i during the check decreases so that it drops along a dotted line on the scale of 1.41 V in FIG. 12. For example, it is judged at the third check by the check voltage $E_1$ that the detected electric current i is smaller than (or equal to) the standard electric current K for judging. Since the number (three) of the present checks for getting the judgment that the detected electric current i is smaller than (or equal to) the standard electric current K for judging is smaller than the number (twenty) of the last checks by use of the lowest check voltage $E_0$ for getting the judgment that the detected electric current i is smaller than (or equal to) the standard electric current K for judging, charge of the battery should be continued.

Then, the voltage increment device sets the after-next check voltage $E_2$ to 1.42 V made by the check voltage $E_1$ plus 0.01 V. During the first check of charging condition by use of this check voltage $E_2$, about 2 mA electric current flows through the nickel-hydrogen battery. As the number of the checks by use of the check voltage $E_2$ increases, the detected electric current i during check decreases so that it drops along a dotted line on the scale of 1.42 V in FIG. 12. For example, it is judged at the third check by the check voltage $E_2$ that the detected electric current i is smaller than (or equal to) the standard electric current K for judging. Since the number (three) of the present checks for getting the judgment that the detected electric current i is smaller than (or equal to) the standard electric current K for judging is equal to the number (three) of the last checks by use of the check voltage $E_1$ for getting the judgment that the detected electric current i is smaller than (or equal to) the standard electric current K for judging, charge of the battery should be continued.

After this, the charging condition of the battery is checked similarly. If the number of checks by use of the check voltage 1.47 V for getting the judgment that the detected electric current i is smaller than (or equal to) the standard electric current K for judging exceeds six, i.e., twice as large as the number of the last checks by use of the check voltage 1.46 V for getting the judgment that the detected electric current i is smaller than (or equal to) the standard electric current K for judging, charge of the nickel-hydrogen battery is stopped. In this way, the secondary battery is charged till the charging rate of the secondary battery comes to approximately 100%.

Figure 13:
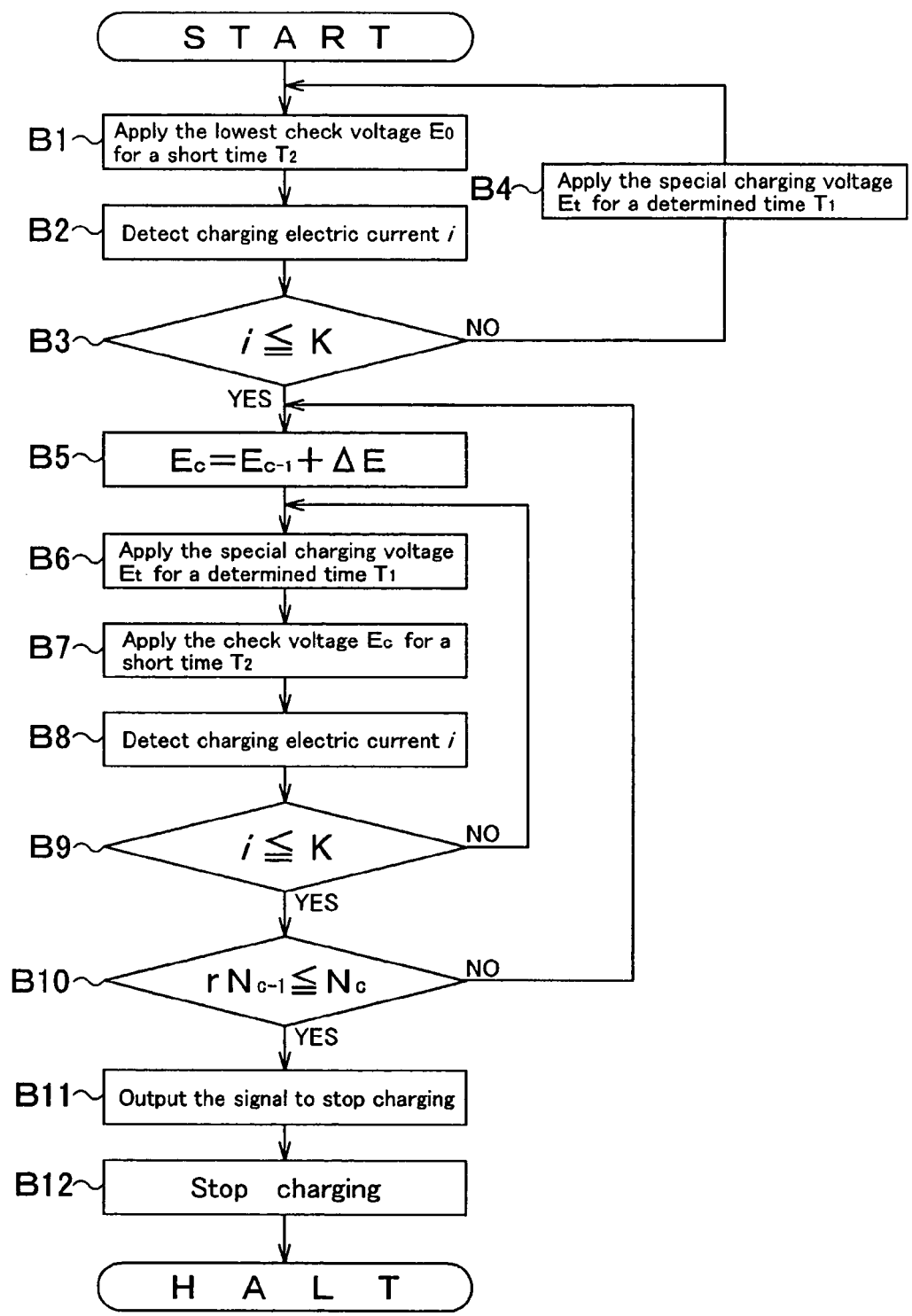
FIG. 13 is a flow chart of charging control by a charging equipment 1 for a secondary battery according to the present invention.

Next, the flow of charging the secondary battery 10 by the charging equipment 1 of the present invention will be explained referring to FIG. 13.

First of all, a user sets a secondary battery 10 on the charging equipment 1, and manipulates the operation switch 6 so that the lowest check voltage $E_0$ which is lower than rated equilibrium voltage at full charge of a secondary battery of any kind and any size to be charged by the charging equipment 1 is applied to the secondary battery 10 for a short time (e.g. 5 seconds) $T_2$ [step B1].

While the lowest check voltage $E_0$ is applied to the secondary battery 10 for a short time $T_2$, the current detection part 46 detects electric current i flowing through the secondary battery 10 [step B2], and the first judging program is executed for judging about the detected electric current i [step B3].

When the detected electric current i is larger than the standard electric current K for judging [step B3], the switch 58 is switched to change the applied voltage to the special charging voltage $E_f$, and the special charging voltage $E_f$ is applied to the secondary battery 10 for a predetermined time (e.g. 55 seconds) $T_1$ [step B4]. By this special charging voltage $E_f$, electricity is charged to the secondary battery 10. After a lapse of the predetermined time $T_1$, the switch 58 is switched to change the applied voltage to the lowest check voltage $E_0$ and the control step returns to the step B1.

Otherwise, i.e., when the detected electric current i is smaller than (or equal to) the standard electric current K for judging [step B3], the voltage increment device sets renewed check voltage $E_c(=E_{c-1}+E)$ made by the present check voltage $E_c$ (including the lowest check voltage $E_0$) plus the pitch of voltage $\Delta E$ (e.g. 0.01 V) [step B5], and the switch 58 is switched to change the applied voltage to the special charging voltage $E_f$, and the special charging voltage $E_f$ is applied to the secondary battery 10 for a predetermined time (e.g. 55 seconds) $T_1$ [step B6].

After a lapse of the predetermined time $T_1$, the switch 58 is switched to change the applied voltage to the renewed check voltage $E_c$, and the renewed check voltage $E_c$ is applied to the secondary battery 10 for a short time $T_2$ [step B7]. During the short time $T_2$, the current detection part 46 detects electric current i flowing through the secondary battery 10 [step B8], and the first judging program is executed to judge about the detected electric current i [step B9].

When the detected electric current i is larger than the standard electric current K for judging [step B9], the control step returns to the step B5. Otherwise, i.e., when the detected electric current i is smaller than (or equal to) the standard electric current K for judging [step B9], the counted number $N_c$ of the switchings to set the check voltage $E_c$ for the period from the last affirmative judgment (judgment that the detected electric current i is smaller than (or equal to) than the standard electric current K for judging) by the first judging program to the present affirmative judgment (judgment that the detected electric current i is smaller than (or equal to) the standard electric current K for judging) is judged by the second judging program [step B10].

The counted number $N_c$ of switchings is registered by the count program. When the second judging program judges that the number $N_c$ of the switchings to set the check voltage $E_c$ for the period from the last affirmative judgment judged by the first judging program to the present affirmative judgment is smaller than (or equal to) r times as large as the number $N_{c-1}$ of the switchings to set the check voltage $E_{c-1}$ for the period from the before-last affirmative judgment to the last affirmative judgment [step B10], the control step returns to the step B6. Otherwise, i.e., when the second judging program judges that the number $N_c$ of the switchings to set the check voltage $E_c$ for the period from the last affirmative judgment judged by the first judging program to the present affirmative judgment is larger than r times as large as the number $N_{c-1}$ of the switchings to set the check voltage $E_{c-1}$ for the period from the before-last affirmative judgment to the last affirmative judgment [step B10], a signal to stop charging is outputted [step B11], so as to stop charging the secondary battery [step B12].

In addition, when the signal to stop charging is outputted at the step B11, charging of the secondary battery 10 may be stopped immediately, or extra charge of electricity may be given to the secondary battery 10 for a certain time before charging of the secondary battery 10 is stopped. As for the latter case, for example, when the signal to stop charging is outputted, applied voltage is switched to the special charging voltage $E_f$ by the switch 58 and the special charging voltage $E_f$ is applied to the secondary battery 10 for a second predetermined time $T_3$, then charging of the secondary battery 10 is finished. Alternatively, when the signal to stop charging is outputted, a cycle consisting of application of the special charging voltage $E_f$ for a predetermined time $T_1$ and application of the above-mentioned check voltage $E_c$ for a short time $T_2$ may be repeated predetermined times before charging of the secondary battery 10 is finished.

Thus the secondary battery 10 is charged, so that charging rate of the secondary battery can come closer to 100%.

As constructed above, by the charging equipment 1 for a secondary battery of the present invention, any secondary battery 10, regardless of the kind, size and so on, can have its own equilibrium voltage at full charge sought so as to be fully charged, whereby its charging rate becomes approximately 100%, thereby improving its reliability. Furthermore, even if the secondary battery 10 to be charged has an internal structure partially destroyed and degraded, the charging equipment 1 can seek the present equilibrium voltage at full charge of the secondary battery 10 so as to fully charge the secondary battery 10, whereby the charging rate of the secondary battery 10 becomes approximately 100%.

Next, the theory of charge by the charging equipment 1 for a secondary battery of the present invention will be explained.

FIG. 14 illustrates three typical asymptotic function charts approaching respective fixed values. Of the functions represented by the charts, the function of FIG. 14(*b*) is not applicable to charge by the charging equipment 1 for a secondary battery of the present invention. Therefore, only the functions of FIG. 14(*a*) and FIG. 14(*c*) will be taken into account.

Figure 15:
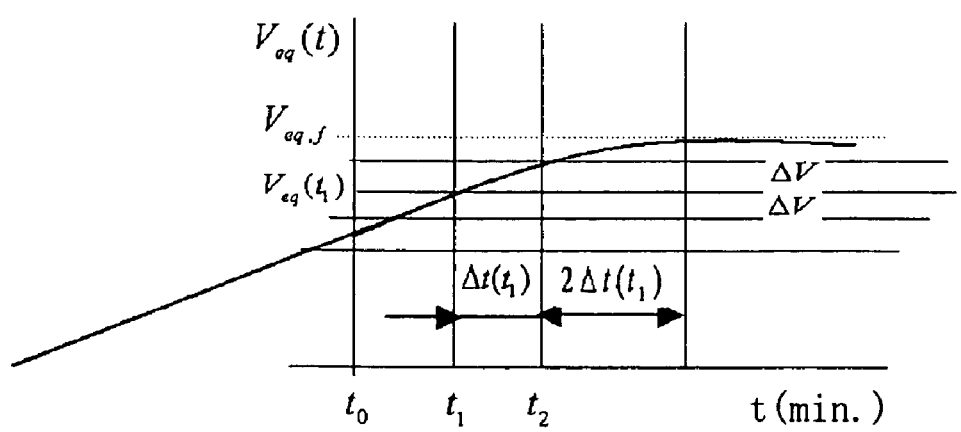
FIG. 15 is a graph showing the asymptotic characteristic shown in FIG. 14(a).

First, the function of FIG. 14(*a*) will be explained. As shown in FIG. 15, if an electric potential for saturating a fully charged secondary battery, whose charging rate is 100%, is expressed with $V_{eq,f}$, electromotive voltage $V_{eq}(t)$ of the secondary battery is formulated with a following formula (a-1).

Formula (a-1)

$$V_{eq}(t)=\{V_{eq,f}-V_{eq}(t_0)\}(1-e^{-\lambda((t-t_0))})+V_{eq}(t_0) \quad \text{(a-1)}$$

When the variable time t becomes $t_1$, the electromotive voltage $V_{eq}(t_1)$ is expressed with a following formula (a-2).

Formula (a-2)

$$V_{eq}(t_1)=\{V_{eq,f}-V_{eq}(t_0)\}(1-e^{-\lambda(t_1-t_0)})+V_{eq}(t_0) \quad \text{(a-2)}$$

From this state, the check voltage is renewed by increment of $\Delta V$. A time $\Delta t(t_n)$ for equilibrating the battery electromotive voltage with the renewed check voltage is expressed with a following formula (a-3).

Formula (a-3)

$$V_{eq}(t_1)+\Delta V=\{V_{eq,f}-V_{eq}(t_0)\}(1-e^{-\lambda(t_1+\Delta(t_1)-t_0)})+V_{eq}(t_0)$$
$$=V_{eq}(t_2) \quad \text{(a-3)}$$

A following formula (a-4) is the rearranged formula (a-3). When the formula (a-2) is substituted for the formula (a-3), the formula (a-4) is expressed with a formula (a-5).

Formulas (a-4) and (a-5)

$$\Delta t(t_1) = \frac{1}{\lambda}\ln\left[1 - \frac{\Delta V}{\{V_{eq,f}-V_{eq}(t_0)\}e^{-\lambda(t_1-t_0)}}\right]^{-1} \quad \text{(a-4)}$$

$$\Delta t(t_1) = \frac{1}{\lambda}\ln\left[\frac{V_{eq,f}-V_{eq}(t_1)}{V_{eq,f}-V_{eq}(t_1)-\Delta V}\right] \quad \text{(a-5)}$$

When a time $2\Delta(t_1)$ has passed since the time $t_2$, battery voltage $V_{eq}(t_2+2\Delta(t_1))$ is computed by the formula (a-3), and compared with $V_{eq}(t_2)+\Delta V$.

That is, a following formula (a-6) made by the formula (a-1), in which $t_1+3\Delta(t_1)$ is substituted for t, is compared with a following formula (a-7) made by the formula (a-1) plus $\Delta V$ in which $t_2$ is substituted for t.

Formulas (a-6) and (a-7)

$$V_{eq}(t_1+3\Delta t(t_1))=\{V_{eq,f}-V_{eq}(t_0)\}(1-e^{-\lambda(t_1-t_0+3\Delta t(t_1))})+V_{eq}(t_0) \quad \text{(a-6)}$$

$$V_{eq}(t_2))+\Delta V=\{V_{eq,f}-V_{eq}(t_0)\}(1-e^{-\lambda(t_1+\Delta t(t_1)-t_0)})+V_{eq}(t_0) \quad \text{(a-7)}$$

When the formula (a-6) is larger than the formula (a-7), the time $t_2$ serves as a base point, and charge is continued. Otherwise, when the formula (a-6) is smaller than the formula (a-7), charge is finished, whereby the battery electromotive voltage is prescribed by the formula (a-6). A following formula (a-8) is made by the calculated value of the formula (a-6) minus the calculated value of the formula (a-7).

Formula (a-8)

$$A = \{V_{eq,f}-V_{eq}(t_0)\}e^{-\lambda(t_1-t_0)}e^{-\lambda\Delta t(t_1)}(1-e^{-2\lambda\Delta t(t_1)})-\Delta V \quad \text{(a-8)}$$
$$= \{V_{eq,f}-V_{eq}(t_1)-\Delta V\}(1-e^{-2\lambda\Delta t(t_1)})-\Delta V$$

Figure 16:
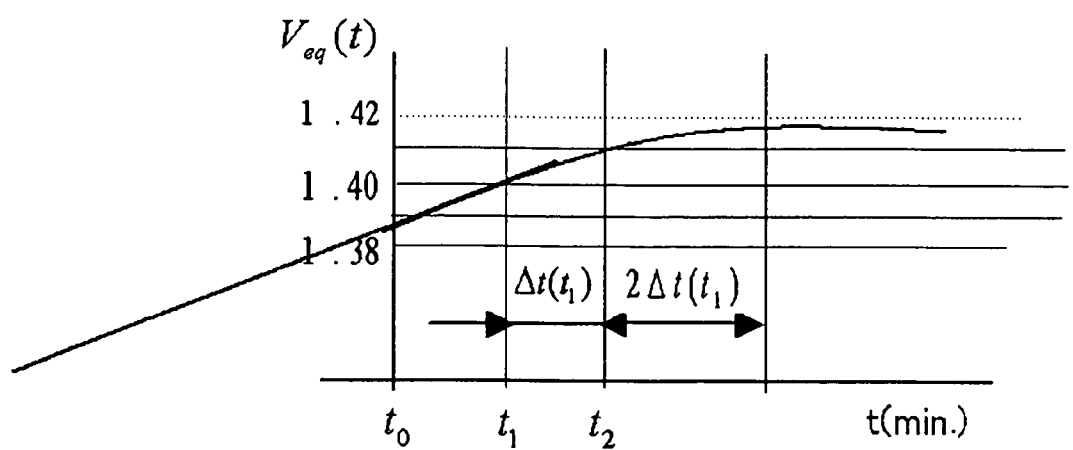
FIG. 16 is a graph showing the asymptotic characteristic shown in FIG. 14(a).

For example, Constants about a secondary battery are assumed as follows: $V_{eq,f}$=1.417 V, $V_{eq}(t_0)$=1.385 V. A constant $\lambda$ is decided based on charging electric current, and an increment of compared voltage $\Delta V$ is 0.01 V. In case of the pattern of the time-voltage curve in FIG. 16, the time $t_1$ serves as the base point of computation. (Even if the check voltage for start is set as 1.38 V, the time to be controlled is after the time $t_1$ in FIG. 16.)

These values are substituted for respective constants in the formula (a-8). As a result, a following formula (a-9) is given.

Formula (a-9)

$$A=\{V_{eq,f}-V_{eq}(t_1)-\Delta V\}(1-e^{-2\lambda\Delta t(t_1)})-\Delta V=(1.407-V_{eq}(t_1))(1-e^{-2\lambda\Delta t(t_1)})-0.01 \quad \text{(a-9)}$$

Basing on the above-mentioned formulas, a case where a constant r concerning the judgment by the second judgment program in the charging equipment 1 for a secondary battery of the present invention is set as r=2 will be explained.

As shown in FIG. 17, first of all, the lowest check voltage is set to 1.39 V, and then charge of a secondary battery is started. In the progress of charge, when the electromotive voltage of the secondary battery becomes 1.39 V, it means that the voltage is equilibrated to that of the fully charged secondary battery, whereby charging of the secondary battery is halted.

Next, the check voltage is renewed by the increment of 0.01 V so that the renewed check voltage becomes 1.40 V. The battery electromotive voltage becomes 1.40 V just after a certain time (in the example of FIG. 17, dimensionless time 0.463) has passed. The check voltage is further renewed by the increment of 0.01 V so that the renewed check voltage becomes 1.41 V. When the charge time exceeds twice as long as the time (dimensionless time 0.887) for increasing the battery electromotive voltage from 1.40 V to 1.41 V, charging of the secondary battery is stopped.

By the charging method, even if various secondary batteries have different electromotive voltages, any secondary battery can have a battery electromotive voltage precisely approaching its battery electromotive voltage at full charge, as long as the charging pattern of the secondary battery is as mentioned above. Therefore, any secondary battery can be fully charged regardless of a kind thereof.

Next, the function of FIG. 14(c) will be explained.

Figure 18:
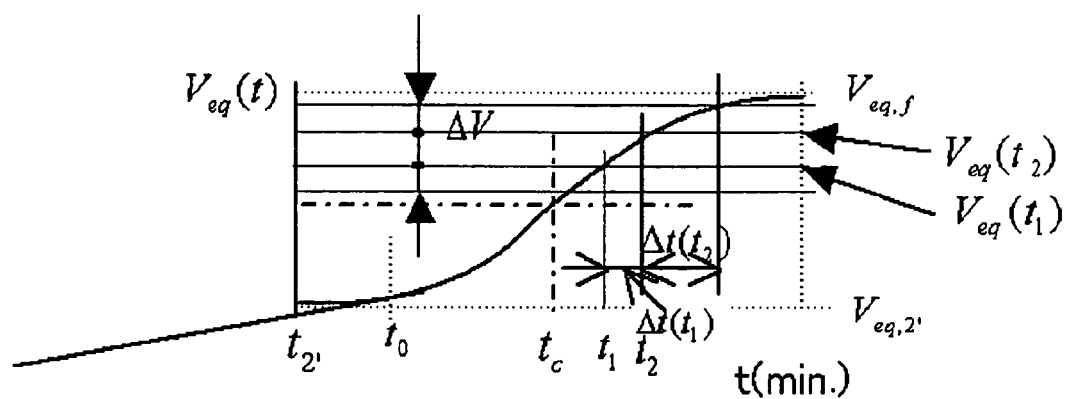
FIG. 18 is a graph showing the asymptotic characteristic shown in FIG. 14(c).

In brief, as shown in FIG. 18, by this charge pattern, the battery voltage is equilibrated with the check voltage $V_{eq}(t_1)$ when the time t becomes $t_1$. The check voltage is renewed by the increment of $\Delta V$, and charging of the secondary battery is continued. The time required for equilibrating the battery electromotive voltage with the renewed check voltage is expressed as $\Delta t(t_1)$. Equilibrium voltage at this moment is expressed as $V_{eq}(t_1) + \Delta V$. The check voltage is further renewed by the increment of $\Delta V$, and charging of the secondary battery is continued. After the lapse of the time 2 $\Delta t(t_1)$, if the battery electromotive voltage is not equilibrated with the second renewed check voltage, charging of the secondary battery is finished. Otherwise, if the battery electromotive voltage is equilibrated with the second renewed check voltage before the lapse of the time 2 $\Delta t(t_1)$, the time required for equilibrating the battery electromotive voltage with the second renewed check voltage is expressed as $\Delta t(t_2)$, and equilibrium voltage $V_{eq}$ is expressed as $V_{eq}(t_1) + 2\Delta V$. Then, the check voltage is renewed and renewed by the increments of $\Delta V$, and the above-mentioned process is repeated.

A potential curve shown in FIG. 18 represents a following formula (b-1) as mathematical deduction of the above-mentioned charge control.

Formula (b-1)

$$V_{eq}(t) = (V_{eq,f} - V_{eq,2'}) \frac{1}{1 + e^{-\lambda(t - t_c)}} + V_{eq,2'} \quad \text{(b-1)}$$

The formula (b-1) becomes a following formula (b-2) when a time $t_1$ is substituted for the variable time t.

Formula (b-2)

$$V_{eq}(t_1) = (V_{eq,f} - V_{eq,2'}) \frac{1}{1 + e^{-\lambda(t_1 - t_c)}} + V_{eq,2'} \quad \text{(b-2)}$$

Then, the time required for increment of voltage by $\Delta V$ since this moment is computed as follows.

Formula (b-3)

$$V_{eq}(t_2) = V_{eq}(t_1) + \Delta V \quad \text{(b-3)}$$

$$= (V_{eq,f} - V_{eq,2'}) \frac{1}{1 + e^{-\lambda(t_1 + \Delta t(t_1) - t_c)}} + V_{eq,2'}$$

A following formula (b-3') is a transformation of the above formula (b-3).

Formula (a-3')

$$\Delta t(t_1) = \frac{1}{\lambda} \ln \left\{ \frac{1 + \frac{\Delta V}{(V_{eq,f} - V_{eq,2'})}(1 + e^{-\lambda(t_1 - t_c)})}{1 - \frac{\Delta V}{(V_{eq,f} - V_{eq,2'})}(1 + e^{\lambda(t_1 - t_c)})} \right\} \quad \text{(b-3')}$$

A following formula (B-2') is another transformation of the above formula (b-2).

Formula (B-2')

$$e^{-\lambda(t - t_c)} = \frac{V_{eq,f} - V_{eq}(t)}{V_{eq}(t) - V_{eq,2'}} \quad \text{(b-2')}$$

Basing on the above-mentioned formulas, an example wherein a constant r concerning the judgment by the second judgment program in the charging equipment 1 for a secondary battery of the present invention is set as r=2 will be explained.

When the check voltage is incremented in increments of 0.01 V, the time required to clear the height of the bar (the check voltage) differs according to difference of the step of charge (the rate of charge). Equilibrium voltage at the time of finishing charging when the present required time becomes twice as large as the last required time is computed.

In FIG. 19, the lowest check voltage compared to the first height of the bar is set to 1.40 V. When the check voltage is incremented from 1.40 V to 1.41 V, the dimensionless time required to clear the incremented voltage is 1.299. The time (dimensionless time 0.673) for increment of check voltage from 1.43 V to 1.44 V is the shortest in FIG. 19. As the check voltage is further incremented, the time required to clear the further incremented check voltage becomes longer, and, if worse comes to worst, it may become too long to clear the check voltage. Therefore, it is decided that charging of the secondary battery is finished when the present charge time reaches twice the last time required for clearing the check voltage. Target achievement rates of charging are drawn in the bottom cells of the table of FIG. 19. As shown in the table, according to this charging method, just after charging of a secondary battery is finished, the achievement rate of the charging reaches 99.97% of the proper electromotive voltage at full charge of the secondary battery.

The above explanation is directed to the case when the constant r concerning the judgment by the second judgment program in the charging equipment 1 for a secondary battery of the present invention is set as r=2. The setting of the constant r is not limited if r is not smaller than 1. If the constant r is set as r=1, charging of the secondary battery is stopped near the inflection point (the voltage at the time $t=t_c$) of the voltage curve in FIG. 18, and the charging rate of the secondary battery at the time of finishing charging becomes about 80%. The charging method under such a setting of the constant r is also available such that the secondary battery can be charged without reaching the irreversible chemical reaction region D, thereby increasing effective battery cycles of the charged secondary battery to five thousands times or more.

The invention claimed is:

1. A charger for a secondary battery, comprising:
   a voltage increment means for incrementing a check voltage by a preset pitch of voltage, the incrementing being from a lowest check voltage lower than a rated equilibrium voltage at full charge of any secondary battery of all kinds to be charged;
   a charge voltage supply means for supplying special charging voltage, wherein the special charging voltage is higher than the rated equilibrium voltage at full charge of any secondary battery of all kinds to be charged, but does not enter an irreversible chemical reaction region;

a switch means for switching voltage applied to the secondary battery between a voltage selected from the group consisting of the special charging voltages supplied by the charge voltage supply means, and the check voltage supplied by the voltage increment means;

a current detection means for detecting an electric current flowing through the secondary battery during application of the check voltage to the secondary battery;

a first judging means for judging whether the electric current detected by the current detection means is smaller than or as large as a preset standard electric current for judging; and a second judging means for judging whether a time required for a period from the last affirmative judgment judged by the first judging means to the present affirmative judgment judged by the first judging means is larger than r times as large as a time required for a period from the before-last affirmative judgment judged by the first judging means to the last affirmative judgment judged by the first judging means, where r is a real number not smaller than 1, wherein charging of the secondary battery is controlled according to the following:

wherein in the first step the lowest check voltage is applied to the secondary battery for a short time, and the current detection means detects electric current flowing through the secondary battery during the short time;

wherein in the second step the first judging means judges the detected electric current so as to execute a command selected from the group consisting of:
 passing to the third step when the electric current is larger than the standard electric current for judging, and
 jumping to the fourth step when the electric current is smaller than or as large as the standard electric current for judging;

wherein in the third step the switch means switches the applied voltage to the special charging voltage, the special charging voltage being applied to the secondary battery for a predetermined time, and then the switch means switches the applied voltage to the lowest check voltage, and a step returns to the first step;

wherein in the fourth step the voltage increment means sets a renewed check voltage made by the present check voltage plus the pitch of voltage;

wherein in the fifth step the switch means switches the applied voltage to the special charging voltage, the special charging voltage being applied to the secondary battery for a predetermined time, and then the switch means switches the applied voltage to the renewed check voltage, the renewed check voltage is applied to the secondary battery for a short time, wherein the current detection means detects electric current flowing through the secondary battery during the application of the renewed check voltage to the secondary battery;

wherein in the sixth step the first judging means judges the detected electric current so as to execute a command selected from the group consisting of:
 returning to the fifth step when the electric current is larger than the standard electric current for judging, and
 passing to the seventh step when the electric current is smaller than or as large as the standard electric current for judging; and wherein in the seventh step the second judging means judges the time required for the period from the last affirmative judgment judged by the first judging means to the present affirmative judgment judged by the first judging means so as to execute a command selected from the group consisting of:
 returning to the fourth step when the time required for the period from the last affirmative judgment judged by the first judging means to the present affirmative judgment judged by the first judging means is not larger than r times as large as the time required for the period from the before-last affirmative judgment judged by the first judging means to the last affirmative judgment judged by the first judging means, and
 outputting a signal to stop charging when the time required for the period from the last affirmative judgment judged by the first judging means to the present affirmative judgment judged by the first judging means is larger than r times as large as the time required for the period from the before-last affirmative judgment judged by the first judging means to the last affirmative judgment judged by the first judging means.

2. The charger for a secondary battery according to claim 1, wherein, when the signal to stop charging is outputted at the seventh step, the switch means switches the applied voltage to the special charging voltage, the special charging voltage being applied to the secondary battery for a second predetermined time, and then charge of the secondary battery is finished.

3. The charger for a secondary battery according to claim 1, wherein the required time is measured by counting the number of switchings of the applied voltage to the check voltage by the switch means.

4. The charger for a secondary battery according to any of claims claim 1, the voltage increment means comprising:
 a microcomputer for outputting a pulse wave of pulse width $c \cdot w$ from one predetermined output terminal, wherein w is a time having a length of one of n equal divisional parts of one cycle of the pulse wave, wherein n is an integer not smaller than 2, and c is a variable represented as an integer between 1 and n.
 a supremum and infimum voltage setting circuit for inverting the maximum and the minimum amplitude of the pulse wave outputted from an output terminal to each other, and setting the maximum amplitude of the inverted pulse wave as a supremum voltage and the minimum amplitude of the inverted pulse wave as an infimum voltage; and
 an arithmetic circuit for averaging the voltage of the pulse wave outputted from the supremum and infimum voltage setting circuit, and outputting a value of voltage made by a base voltage minus the just averaged voltage,
wherein the valuable variable c in the microcomputer is incremented, so that the value of voltage outputted from the arithmetic circuit is incremented by the pitch of voltage.

5. The charger for a secondary battery according to claim 1, the voltage increment means comprising:
 a microcomputer for outputting a pulse wave of pulse width $c \cdot w$ from one predetermined output terminal, wherein w is a time having a length of one of n equal divisional parts of one cycle of the pulse wave, wherein n is an integer not smaller than 2, and c is a variable represented as an integer between 1 and n;

a supremum and infimum voltage setting circuit for setting the maximum amplitude of the pulse wave outputted from an output terminal as a supremum voltage and the minimum amplitude of the pulse wave as an infimum voltage; and an arithmetic circuit for averaging the voltage of the pulse wave outputted from the supremum and infimum voltage setting circuit, and outputting a value of voltage made by a base voltage plus the just averaged voltage, wherein the variable c in the microcomputer is incremented, so that the value of voltage outputted from the arithmetic circuit is incremented by the pitch of voltage.

6. The charger for a secondary battery according to claim 1, the voltage increment means comprising:

a microcomputer for outputting a pulse wave of pulse width c·w from one predetermined output terminal on the premise that w is a time having a length of one of n equal divisional parts of one cycle of the pulse wave, where n is an integer not smaller than 2, and c is a variable represented as an integer between 1 and n;

a supremum and infimum voltage setting circuit for inverting the maximum and the minimum amplitude of the pulse wave outputted from an output terminal to each other, and setting the maximum amplitude of the inverted pulse wave as a supremum voltage and the minimum amplitude of the inverted pulse wave as an infimum voltage; and an arithmetic circuit for averaging the voltage of the pulse wave outputted from the supremum and infimum voltage setting circuit, and outputting a value of voltage made by a base voltage plus the just averaged voltage, wherein the variable c in the microcomputer is decreased, so that the value of voltage outputted from the arithmetic circuit is incremented by the pitch of voltage.

7. The charger for a secondary battery according to claim 1, the voltage increment means comprising:

a microcomputer for outputting a pulse wave of pulse width c·w from one predetermined output terminal on the premise that w is a time having a length of one of n equal divisional parts of one cycle of the pulse wave, where n is an integer not smaller than 2, and c is a variable represented as an integer between 1 and n;

a supremum and infimum voltage setting circuit for setting the maximum amplitude of the pulse wave outputted from an output terminal as a supremum voltage and the minimum amplitude of the pulse wave as an infimum voltage; and an arithmetic circuit for averaging the voltage of the pulse wave outputted from the supremum and infimum voltage setting circuit, and outputting a value of voltage made by a base voltage minus the just averaged voltage, wherein the variable c in the microcomputer is decreased, so that the value of voltage outputted from the arithmetic circuit is incremented by the pitch of voltage.

8. The charger for a secondary battery according to claim 2, wherein the required time is measured by counting the number of switchings of the applied voltage to the check voltage by the switch means.

9. The charger for a secondary battery according to claim 2, the voltage increment means comprising:

a microcomputer for outputting a pulse wave of pulse width c·w from one predetermined output terminal, wherein w is a time having a length of one of n equal divisional parts of one cycle of the pulse wave, where n is an integer not smaller than 2, and c is a variable represented as an integer between 1 and n;

a supremum and infimum voltage setting circuit for inverting the maximum and the minimum amplitude of the pulse wave outputted from an output terminal to each other, and setting the maximum amplitude of the inverted pulse wave as a supremum voltage and the minimum of amplitude the inverted pulse wave as an infimum voltage; and an arithmetic circuit for averaging the voltage of the pulse wave outputted from the supremum and infimum voltage setting circuit, and outputting a value of voltage made by a base voltage minus the just averaged voltage, wherein the variable c in the microcomputer is incremented, so that the value of voltage outputted from the arithmetic circuit is incremented by the pitch of voltage.

10. The charger for a secondary battery according to claim 3, the voltage increment means comprising:

a microcomputer for outputting a pulse wave of pulse width c·w from one predetermined output terminal, wherein w is a time having a length of one of n equal divisional parts of one cycle of the pulse wave, wherein n is an integer not smaller than 2, and c is a variable represented as an integer between 1 and n;

a supremum and infimum voltage setting circuit for inverting the maximum and the minimum amplitude of the pulse wave outputted from an output terminal to each other, and setting the maximum amplitude of the inverted pulse wave as a supremum voltage and the minimum amplitude of the inverted pulse wave as an infimum voltage; and an arithmetic circuit for averaging the voltage of the pulse wave outputted from the supremum and infimum voltage setting circuit, and outputting a value of voltage made by a base voltage minus the just averaged voltage, wherein the variable c in the microcomputer is incremented, so that the value of voltage outputted from the arithmetic circuit is incremented by the pitch of voltage.

11. The charger for a secondary battery according to claim 2, the voltage increment means comprising:

a microcomputer for outputting a pulse wave of pulse width c·w from one predetermined output terminal, wherein w is a time having a length of one of n equal divisional parts of one cycle of the pulse wave, where n is an integer not smaller than 2, and c is a variable represented as an integer between 1 and n;

a supremum and infimum voltage setting circuit for setting the maximum amplitude of the pulse wave outputted from an output terminal as a supremum voltage and the minimum amplitude of the pulse wave as an infimum voltage; and an arithmetic circuit for averaging the voltage of the pulse wave outputted from the supremum and infimum voltage setting circuit, and outputting a value of voltage made by a base voltage plus the just averaged voltage, wherein the variable c in the microcomputer is incremented, so that the value of voltage outputted from the arithmetic circuit is incremented by the pitch of voltage.

12. The charger for a secondary battery according to claim 3, the voltage increment means comprising:

a microcomputer for outputting a pulse wave of pulse width c·w from one predetermined output terminal wherein w is a time having a length of one of n equal divisional parts of one cycle of the pulse wave, where n is an integer not smaller than 2 and c is a variable represented as an integer between 1 and n;

a supremum and infimum voltage setting circuit for setting the maximum amplitude of the pulse wave outputted from an output terminal as a supremum voltage and the minimum amplitude of the pulse wave as an infimum voltage; and an arithmetic circuit for averaging the voltage of the pulse wave outputted from the supremum and infimum voltage setting circuit, and outputting a value of voltage made by a base voltage plus the just averaged voltage, wherein the variable c in the microcomputer is incremented, so that the value of voltage outputted from the arithmetic circuit is incremented by the pitch of voltage.

13. The charger for a secondary battery according to claim 2, the voltage increment means comprising:

a microcomputer for outputting a pulse wave of pulse width c·w from one predetermined output terminal on the premise that w is a time having a length of one of n equal divisional parts of one cycle of the pulse wave, where n is an integer not smaller than 2 and c is a variable represented as an integer between 1 and n;

a supremum and infimum voltage setting circuit for inverting the maximum and the minimum amplitude of the pulse wave outputted from an output terminal to each other, and setting the maximum amplitude of the inverted pulse wave as a supremum voltage and the minimum of amplitude of the inverted pulse wave as an infimum voltage; and an arithmetic circuit for averaging the voltage of the pulse wave outputted from the supremum and infimum voltage setting circuit, and outputting a value of voltage made by a base voltage plus the just averaged voltage, wherein the variable c in the microcomputer is decreased, so that the value of voltage outputted from the arithmetic circuit is incremented by the pitch of voltage.

14. The charger for a secondary battery according to claim 3, the voltage increment means comprising:

a microcomputer for outputting a pulse wave of pulse width c·w from one predetermined output terminal on the premise that w is a time having a length of one of n equal divisional parts of one cycle of the pulse wave, where n is an integer not smaller than 2 and c is a variable represented as an integer between 1 and n;

a supremum and infimum voltage setting circuit for inverting the maximum and the minimum of amplitude the pulse wave outputted from an output terminal to each other, and setting the maximum amplitude of the inverted pulse wave as a supremum voltage and the minimum of amplitude of the inverted pulse wave as an infimum voltage; and an arithmetic circuit for averaging the voltage of the pulse wave outputted from the supremum and infimum voltage setting circuit, and outputting a value of voltage made by a base voltage plus the just averaged voltage, wherein the variable c in the microcomputer is decremented, so that the value of voltage outputted from the arithmetic circuit is incremented by the pitch of voltage.

15. The charger for a secondary battery according to claim 2, the voltage increment means comprising:

a microcomputer for outputting a pulse wave of pulse width c·w from one predetermined output terminal on the premise that w is a time having a length of one of n (n is an integer not smaller than 2) equal divisional parts of one cycle of the pulse wave, where n is an integer not smaller than 2, and c is a variable represented as an integer between 1 and n;

a supremum and infimum voltage setting circuit for setting the maximum amplitude of the pulse wave outputted from an output terminal as a supremum voltage and the minimum amplitude of the pulse wave as an infimum voltage; and an arithmetic circuit for averaging the voltage of the pulse wave outputted from the supremum and infimum voltage setting circuit, and outputting a value of voltage made by a base voltage minus the just averaged voltage, wherein the variable c in the microcomputer is decreased, so that the value of voltage outputted from the arithmetic circuit is incremented by the pitch of voltage.

16. The charger for a secondary battery according to claim 3, the voltage increment means comprising:

a microcomputer for outputting a pulse wave of pulse width c·w from one predetermined output terminal on the premise that w is a time having a length of one of n equal divisional parts of one cycle of the pulse wave, where n is an integer not smaller than 2, and c is a variable represented as an integer between 1 and n;

a supremum and infimum voltage setting circuit for setting the maximum amplitude the pulse wave outputted from an output terminal as a supremum voltage and the minimum of amplitude of the pulse wave as an infimum voltage; and an arithmetic circuit for averaging the voltage of the pulse wave outputted from the supremum and infimum voltage setting circuit, and outputting a value of voltage made by a base voltage minus the just averaged voltage, wherein the variable c in the microcomputer is decreased, so that the value of voltage outputted from the arithmetic circuit is incremented by the pitch of voltage.

* * * * *